(12) United States Patent
Ma et al.

(10) Patent No.: US 9,377,593 B2
(45) Date of Patent: Jun. 28, 2016

(54) SYSTEM AND METHOD OF ESTIMATING BEAM MODE CONTENT FOR WAVEGUIDE ALIGNMENT

(71) Applicant: Lumentum Operations LLC, Milpitas, CA (US)

(72) Inventors: Xiuquan Ma, Fremont, CA (US); Hongbo Yu, San Jose, CA (US); Martin H. Muendel, Oakland, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/547,183

(22) Filed: Nov. 19, 2014

(65) Prior Publication Data
US 2015/0139638 A1    May 21, 2015

Related U.S. Application Data

(60) Provisional application No. 61/906,274, filed on Nov. 19, 2013.

(51) Int. Cl.
| | |
|---|---|
| *G02B 6/255* | (2006.01) |
| *C03B 37/02* | (2006.01) |
| *G02B 6/42* | (2006.01) |
| *G02B 6/38* | (2006.01) |
| *G01M 11/00* | (2006.01) |
| *H04B 10/2581* | (2013.01) |
| *G02B 6/36* | (2006.01) |

(52) U.S. Cl.
CPC .............. *G02B 6/4221* (2013.01); *G01M 11/33* (2013.01); *G02B 6/2555* (2013.01); *G02B 6/3801* (2013.01); *H04B 10/2581* (2013.01); *G02B 6/3656* (2013.01)

(58) Field of Classification Search
USPC .............. 385/27–29, 50, 95–98, 123; 65/406, 65/407, 501; 356/73.1
See application file for complete search history.

(56) References Cited

U.S. PATENT DOCUMENTS

| | | | |
|---|---|---|---|
| 5,016,971 A | 5/1991 | Hsu et al. | 385/96 |
| 5,127,069 A | 6/1992 | Horton | 385/53 |
| 6,139,196 A | 10/2000 | Feth et al. | 385/97 |
| 7,181,111 B2 | 2/2007 | Ahrens | 385/52 |
| 8,317,412 B2 | 11/2012 | Huang et al. | 385/95 |
| 8,419,296 B2 * | 4/2013 | Murayama | G02B 6/4202 385/136 |
| 2005/0238298 A1 | 10/2005 | Roark et al. | 385/96 |

OTHER PUBLICATIONS

Shapira et al. "Complete modal decomposition for optical waveguides", PRL 94, pp. 143902-1 to 143902-4, Apr. 15, 2005.
Kaiser et al., "Complete modal decomposition for optical fibers using CGH-based correlation filters", Opt. Express, vol. 17, No. 11, pp. 9347-9356, May 25, 2009.
Nicholson et al., "Measuring the Modal Content of Large-Mode-Area Fibers", IEEE Journal of Selected Topics in Quantum Electronics, vol. 15, No. 1, pp. 61-70, Jan./Feb. 2009.

\* cited by examiner

*Primary Examiner* — Akm Enayet Ullah
*Assistant Examiner* — Michael Mooney
(74) *Attorney, Agent, or Firm* — Harrity & Harrity, LLP

(57) ABSTRACT

Alignment of a multimode waveguide to a source of light or another waveguide is evaluated using a multi-wavelength light source and a modal decomposition processing of an intensity profile of a waveguide output beam, wherein inter-modal interference is averaged out over wavelength. Fitting a superposition of mode intensity profiles to a wavelength-averaged intensity profile of the output beam provides information about the modal composition of the output beam, which may be used to assess the alignment of the multimode waveguide with respect to the input light beam, and to provide a feedback for guiding a waveguide alignment process.

20 Claims, 18 Drawing Sheets

SYSTEM AND METHOD OF ESTIMATING BEAM MODE CONTENT FOR WAVEGUIDE ALIGNMENT

CROSS-REFERENCE TO RELATED APPLICATIONS

The present application claims priority from U.S. Provisional Patent Application No. 61/906,274 filed Nov. 19, 2013, entitled "Broadband-source-based real-time fiber modal decomposition analysis", which is incorporated herein by reference.

TECHNICAL FIELD

The embodiments disclosed herein relate generally to multimode optical waveguides, and more particularly relate to systems and methods for real-time evaluation of beam quality and beam modal composition, and for systems and methods for automated or computer-guided multimode waveguide alignment and fiber splicing.

BACKGROUND

High-power fiber lasers typically use Large-Mode-Area (LMA) optical fiber, whose core size is made relatively large in order to decrease the light intensity in the fiber core at a given optical power to avoid fiber damage threshold and performance degradation due to optical non-linearities in the fiber core. However, typical LMA fibers that are currently used in commercial products are multimode fibers, which may degrade the quality of a light beam at the fiber output.

Indeed, the quality of the light beam from an optical fiber output, which defines for example how well the beam may be focused using conventional optical elements, depends on a modal composition of the beam. One conventional way to describe the beam quality is by means of a so-called M2 factor, also known as the $M^2$ factor, which relates how much the intensity profile of the beam deviates from an ideal intensity profile of diffraction-limited Gaussian beam. For a theoretical TEM00 mode, which is easiest to focus, M2=1; for a real-life light beam, M2>1. The fundamental mode of a typical multimode optical fiber, such as the LMA fiber used in the high-power fiber lasers, carries the best beam quality compared to all other modes of the fiber, with M2-factor around ~1.1. The higher-order-modes (HOM) of a typical multimode fiber produce worse beam quality with larger value of M2. Typical values of the quality factor M2 for the four lowest-order HOM of an LMA fiber may for example be as follows: from M2~1.1 to M2~3.3 for mode LP11, M2~3.3 for mode LP21, M2~3.3 for mode LP02, M2~4.2 for mode LP31, with even greater M2 values for modes of higher orders. Thus, the beam quality factor for a fiber output beam composed of the fundamental mode and the four next higher order modes may be between M2~1.1 and M2~4.2 depending on the exact modal composition.

It may therefore be desirable to have the ability to evaluate the modal composition of the light beam at the fiber output, i.e. a relative contribution of different fiber modes into the fiber output light beam emitted from the fiber. It is also often desirable to minimize the HOM contribution and maximize the contribution of the fundamental mode into the fiber output beam from a multimode fiber.

Furthermore a typical commercial fiber laser system may include a monolithic strand of optical fiber having multiple fiber-to-fiber splicing points where different types of optical fibers are spliced together. Commercially available fiber splicing devices which can splice together two strands of fiber, also known as fiber splicers, may include a built-in transverse imaging system that provides an image of the fiber ends to assist in geometrically aligning two fiber ends for splicing. This imaging-aided alignment procedure works reasonably well for telecom-grade single-cladding single-mode fibers (SMF) with small-size round-shape geometries that are manufactured using standardized procedures, wherein variations in fiber geometry, such as core/cladding size, shape, and centration, are relatively small. For example, splicing two strands of a standard SMF fiber of the same type, such as "SMF-28e", "HI1060", and "PM980", may produce splicing points with less than 0.1 dB power loss and little, if any, beam distortion at the splice point.

However, fiber alignment that relies on a built-in imaging system may be less reliable for splicing a multimode fiber, such as an LMA fiber of the type used in high power fiber laser systems, with another LMA fiber of a different design or with a smaller-core fiber. Firstly, LMA fibers are often customized and may have significant lot-to-lot variation in size, shape, and centration. Furthermore, a fiber laser typically includes splices between different fiber components, such as gain fibers, pump combiners, fiber gratings, isolator pigtails, etc., which may have different core/cladding geometries and may be produced by different manufactures and/or to different standards, resulting in different cladding/core sizes, shapes and centrations as well. Furthermore, in order to increase optical gain, the cladding of active-core fibers that are used as gain elements usually has a non-round, e.g. octagonal, shape, which may further complicate fiber alignment using conventional transverse imaging systems.

For these reasons, the fiber splicing in high power fiber lasers may benefit from a feedback system to guide the splicing alignment process. In one example wherein the fiber components can be designed to have identical cores, the feedback system for splicing alignment may be based on optimizing core-to-core power transmission between the two fibers, or core-to-clad power ratio, i.e. the ratio between the percentage of light in the core of a second fiber versus the percentage of light in its cladding. This is illustrated in FIGS. 1a and 1b, with FIG. 1b in particular showing that a misalignment of proximate ends of fibers 1 and 2 having identical-size fiber cores 3 would launch light from the core 3 of one of the fibers into the cladding of the other fiber, so that the desired "on-axis" alignment illustrated in FIG. 1a would correspond to the maximum in-core power transmission between the two fibers, or a minimum core-to-clad power ratio at the end of the 2nd fiber. Since the core-clad power ratio has better contrast than in-core power transmission, it may be preferred for use as the external feedback for splicing alignment of identical core-size fibers. However, this method may be less reliable for splicing two fibers having cores of different diameters, as illustrated in FIGS. 2a and 2b. FIG. 2b in particular illustrates by way of example a misalignment between two fibers of different core size, wherein fiber 1 has a core 4 that is smaller in diameters that the core 5 of fiber 2. In this case, an off-axis alignment of the type illustrated in FIG. 2b may not be reliably detected by either the in-core power transmission or the core-to-clad power ratio.

Accordingly, it may be understood that there may be significant problems and shortcomings associated with current solutions and technologies for enabling accurate alignment and splicing of large-core multimode optical fibers, fibers of complex core/cladding structures, and/or of differing core size.

SUMMARY

Accordingly, the present disclosure in one aspect thereof relates to a method and system for evaluating an alignment of a multimode waveguide with respect to a source of light, or to another waveguide, using a modal composition analysis of a waveguide output beam that includes averaging of inter-modal interference over a range of wavelength. Using a suitably wide range of light wavelength at the waveguide input, the modal composition of the light beam at the waveguide output, and therefore the waveguide alignment to the input beam, may be estimated by a computer comparing a wavelength-averaged intensity profile of the output light beam to intensity profiles of one or more waveguide modes of the multimode waveguide, or to a superposition of mode intensity profiles, without the need to retrieve relative mode phase delays in the fiber. The comparison of the acquired wavelength-averaged intensity profile to pre-recorded mode intensity profiles may be performed in real time during a waveguide alignment procedure using highly-efficient conventional fitting algorithms. Information about the modal composition of the output beam may then be used to assess the alignment of the multimode waveguide with respect to the input light beam, and to provide a feedback for guiding the waveguide alignment process. Embodiments of the method may be used for aligning multimode waveguides to other waveguides, including LMA fiber alignment and splicing, in waveguide-light source alignment, and for the purposes of alignment characterization.

One aspect of the disclosure relates to a method comprising: a) launching a plurality of light wavelengths into an input end of a first waveguide with a multi-wavelength light source, wherein the first waveguide is capable of supporting a plurality of waveguide modes; b) receiving an output light beam from an output end of the first waveguide with a photodetector array (PDA) for generating electrical signals carrying beam image data; c) using a computer operationally coupled to the PDA to obtain a multi-wavelength beam intensity profile for the output light beam from the beam image data, wherein the multi-wavelength beam intensity profile comprises contributions from each of the plurality of light wavelengths; and, d) estimating with the computer a relative contribution of a selected waveguide mode from the one or more waveguide modes into the optical power of the output light beam based on the multi-wavelength beam intensity profile and one or more mode intensity profiles corresponding to one or more waveguide modes of the first waveguide. The plurality of light wavelengths launched into the first waveguide spans a wavelength range that is sufficiently broad so as to average out contributions from phase-dependent inter-modal interference at the plurality of light wavelengths into the multi-wavelength beam intensity profile. The wavelength range may be sufficiently broad so that inter-modal optical phase differences that are accrued in propagation from the input end to the output end of the first waveguide between waveguide modes of the first waveguide varies across the wavelength range by at least $2\pi$, so as to average out contributions from phase-dependent inter-modal interference into the measured beam intensity profile.

The method may include providing a second waveguide in front of the first waveguide in an alignment therewith so that an output end of the second waveguide is in a close proximity with the input end of the first waveguide to provide an optical coupling therebetween, and launching the plurality of light wavelengths into the input end of the second waveguide for coupling into the first waveguide. Steps a) to d) may then be repeated for a plurality of different alignments between the second and first waveguides to obtain a plurality of the beam quality values, and one of the plurality of different alignments, which provides a highest beam quality value from the plurality of beam quality values, may be selected as a preferred alignment. The method may further include fixing the output end of the second waveguide and the input end of the first waveguide in a relative position of the preferred alignment between the second waveguide and the first waveguide.

Another aspect of the present disclosure relates to a system, which comprises a waveguide holder for holding a first optical waveguide comprising an input end and an output end, a multi-wavelength light source for launching a plurality of light wavelengths into the input end of the first waveguide, a photodetector array (PDA) for receiving an output optical beam from the output end of the multi-mode optical waveguide and for generating beam image signals comprising a cross-sectional image of the output optical beam, and a computer operationally coupled to the PDA for receiving therefrom the beam image signals. The computer comprises a processor and a memory, wherein the memory stores a set of instructions for causing the processor to execute a process that comprises the following operations: (a) obtaining a multi-wavelength beam intensity profile from the beam image signals, and (b) estimating, based on the multi-wavelength beam profile and one or more mode intensity profiles corresponding to one or more waveguide modes of the first waveguide, a relative contribution of a selected waveguide mode from the one or more waveguide modes into the optical power of the light beam. The set of instructions stored in the memory may further comprise instructions for (d) obtaining a beam quality value that is based at least in part on the relative contribution of the selected waveguide mode. The plurality of light wavelengths launched into the first waveguide spans a wavelength range that is sufficiently broad so that, for any two of the plurality of the waveguide modes, an inter-modal optical phase difference that is accrued in propagation from the input end to the output end of the first waveguide varies across the wavelength range by at least $2\pi$ radian, so as to average out contributions from phase-dependent inter-modal interference into the measured beam intensity profile.

The waveguide holder may comprise a computer-controlled waveguide positioning system for holding a second waveguide in front of the first waveguide in an alignment therewith so that an output end of a second waveguide is in a close proximity with the input end of the first waveguide at a junction for providing an optical coupling therebetween. The computer-controlled waveguide positioning system may then be configured to, responsive to a control signal from the computer, move one of the output end of a second waveguide and the input end of the first waveguide relative to each other so as to controllably vary their relative alignment at the junction. The set of instructions stored in the memory may further comprise instructions for causing the processor to generate control signals for the computer-controlled waveguide positioning system to sequentially position the output end of the second waveguide and the input end of the first waveguide in a plurality of different alignment positions, and to repeat operations (a) to (c) for each of the plurality of different alignment positions to obtain a plurality of the beam quality values. The set of instructions may further include instructions for the processor to select one of the plurality of different alignment positions that provides a highest beam quality value from the plurality of beam quality values as a preferred alignment, and to generate a control signal for the computer-controlled motorized waveguide positioning system to position the output end of the second waveguide and the input end of the first waveguide in a position of the preferred alignment at the junction.

BRIEF DESCRIPTION OF THE DRAWINGS

Embodiments disclosed herein will be described in greater detail with reference to the accompanying drawings, in which like elements are indicated with like reference numerals, and wherein.

DETAILED DESCRIPTION

Figure 1A:
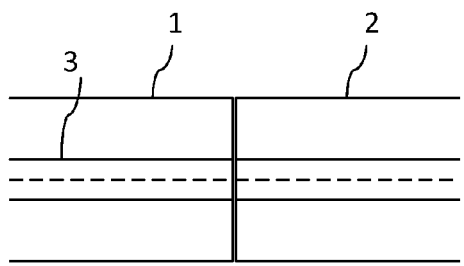
FIG. 1a is a schematic diagram illustrating ideal alignment of two identical optical fibers.
Figure 1B:
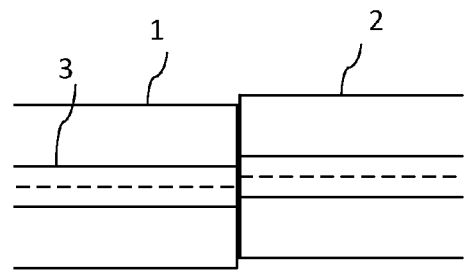
FIG. 1b is a schematic diagram illustrating off-axis alignment of two identical optical fibers.

In the following description, for purposes of explanation and not limitation, specific details are set forth, such as particular optical and electrical circuits, circuit components, assemblies, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description. Note that as used herein, the terms "first", "second" and so forth are not intended to imply sequential ordering, but rather are intended to distinguish one element from another unless explicitly stated. The term 'multimode beam' as used herein means a light beam which origin can be traced to multiple modes of a multimode waveguide. The term 'beam intensity profile' relates to a distribution of light intensity in a cross-section of the beam, such as but not exclusively in a plane that is perpendicular to the direction of beam propagation.

One aspect of the present disclosure provides a method that includes obtaining information about a mode content of a light beam propagating in a multimode optical waveguide, and/or evaluating the quality of a light beam emanating from the multimode optical waveguide. In one aspect, alignment of a multimode waveguide to a source of light or another waveguide may be evaluated using a multi-wavelength light source and a modal decomposition processing of an intensity profile of a waveguide output beam, wherein inter-modal interference is averaged out over wavelength. Fitting a superposition of mode intensity profiles to a wavelength-averaged intensity profile of the output beam provides information about the modal composition of the output beam, which may be used to assess the alignment of the multimode waveguide with respect to the input light beam, and to provide a feedback for guiding a waveguide alignment process.

In the following description, embodiments of this method and other related methods, techniques, and systems will be described with reference to multimode optical fibers, although it will be appreciated that various embodiments described herein may also be applicable to other types of multimode optical waveguides, including but not limited to planar optical waveguides. One embodiment of the method provides a real-time feedback mechanism for multimode fiber alignment.

The beam quality of a multimode light beam relates to a modal composition, or mode content, of the beam. A process of determining the modal composition of a light beam at the output of a multimode waveguide, such as a multimode fiber, using beam measurements may be referred to as the modal decomposition analysis. However, the task of modal decomposition of a beam is complicated due to the coherent wave nature of the fiber modes, wherein a superposition of fields of different fiber modes in the output beam yields inter-modal interference that depends on the phase difference between the modes. Indeed, an intensity profile F(x,y) of a beam composed of a plurality of modes may be mathematically described as follows:

$$F(x, y) = \left| \sum_n c_n f_n(x, y) \right|^2 = \sum_n |c_n|^2 |f_n(x, y)|^2 + K(x, y), \quad (1)$$

where $f_n(x,y)$ denotes a complex wave function of an $n^{th}$ waveguide mode, $c_n$ is its complex amplitude, with $|c_n|=p_n$ defining a relative contribution of the mode in the total optical power of the beam, and the summation is performed over all modes supported by the waveguide. The coefficient $p_n$ may also be referred to herein as the mode power ratio. The term K(x,y) in the right hand side (RHS) of equation (1), which describes the inter-modal interference, depends on the relative phase differences $\Delta\phi_{mn}$ between light in 'm'th and 'n'th fiber modes that are accumulated in propagation through the fiber:

$$K(x, y) = 2\text{Re}\left\{\sum_{n\neq m} c_n c_m^* \exp(i\Delta\varphi_{nm}) f_n(x, y) f_m^*(x, y)\right\} \quad (2)$$

Figure 12A:
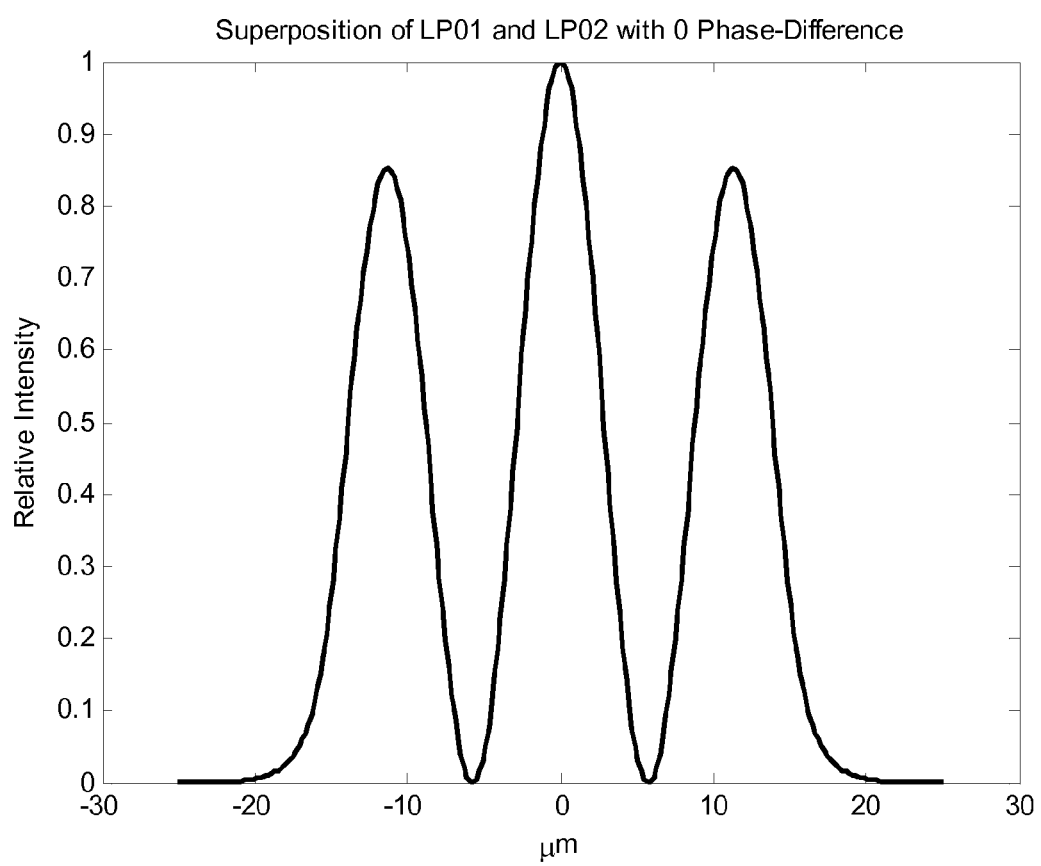
FIG. 12a is a graph illustrating a radial profile of a superposition of LP01 and LP02 modes of equal power with a phase difference of zero radian.
Figure 12B:
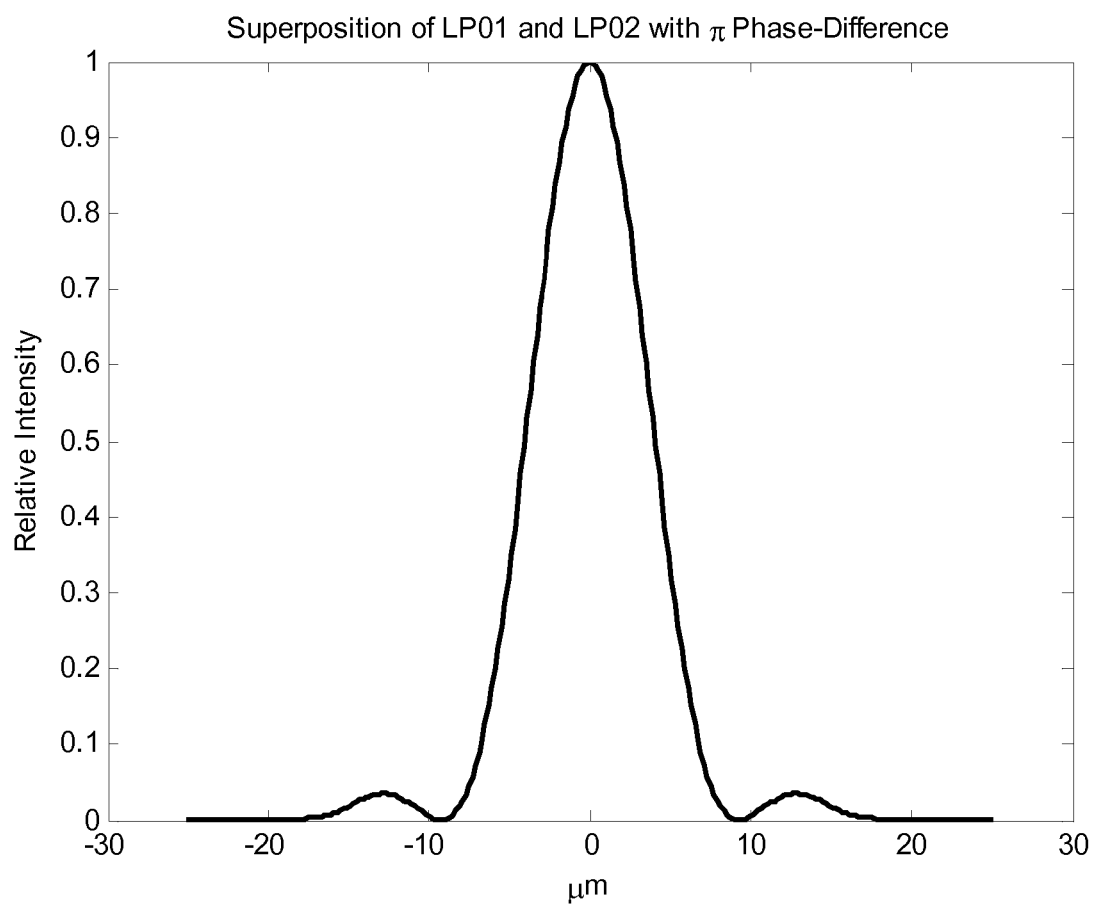
FIG. 12b is a graph illustrating a radial profile of a superposition of LP01 and LP02 modes of equal power with a phase difference of π radian.
Figure 13A:
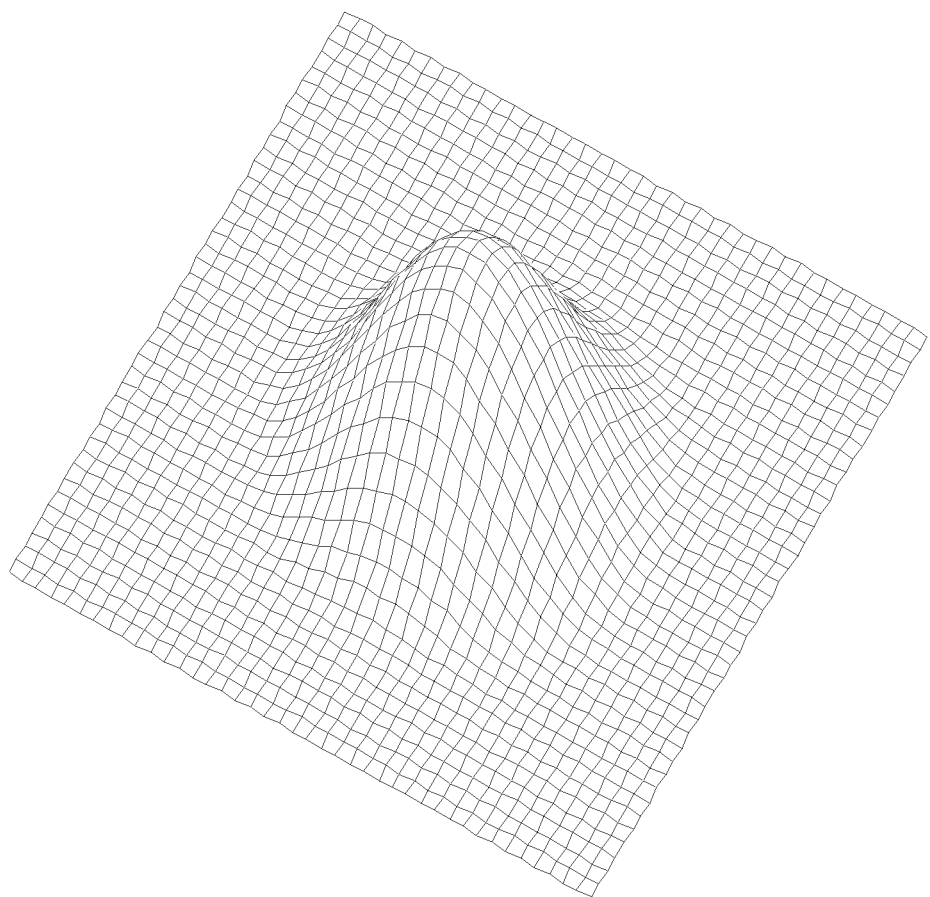
FIGS. 13a-13d are graphs showing simulated 3D intensity profiles of LP01, LP02, LP11 and LP21 fiber modes, respectively, of an exemplary LMA fiber having a core diameter of 30 µm and NA=0.08.
Figure 13B:
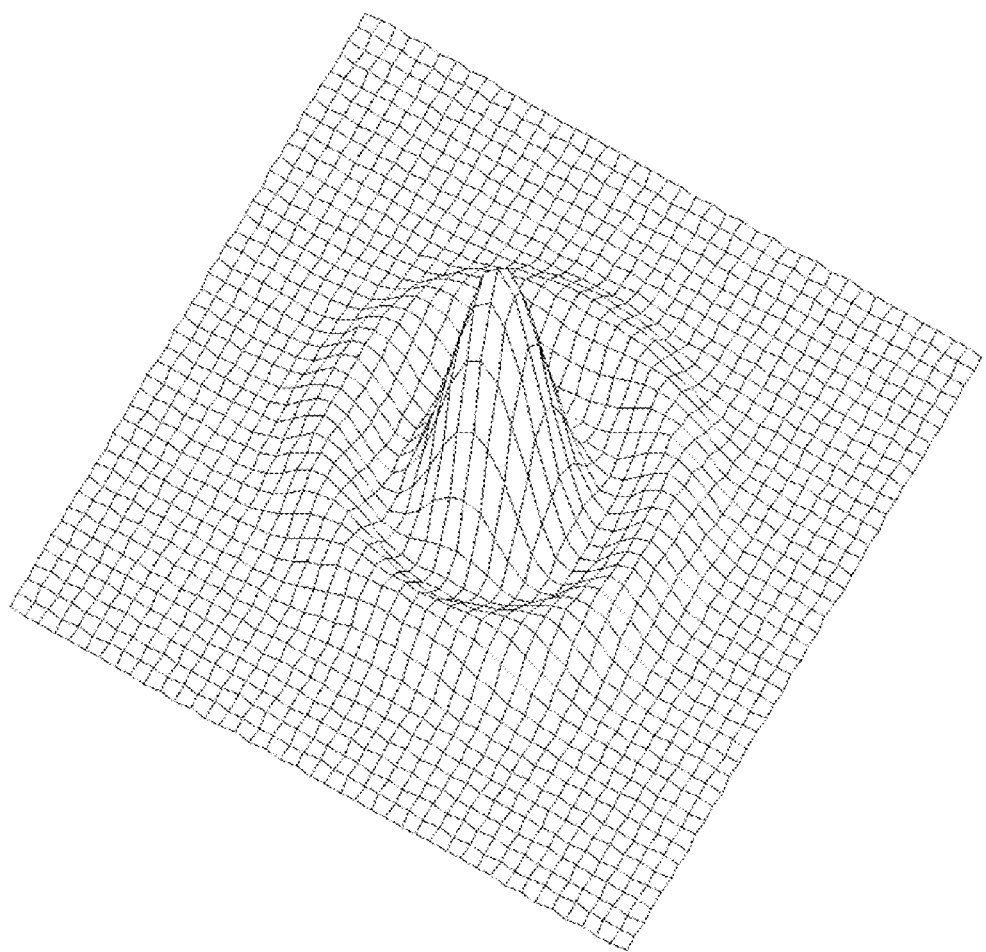
Figure 13C:
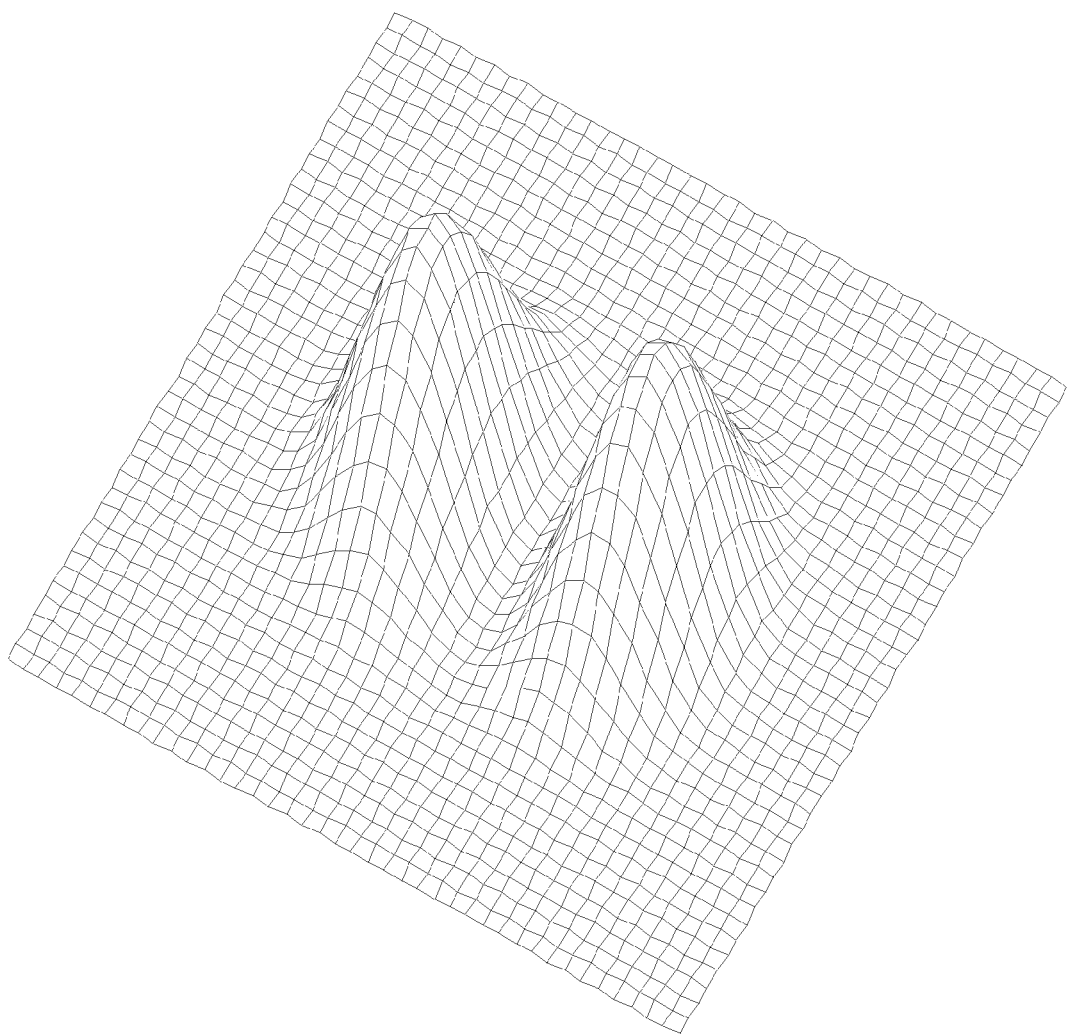
Figure 13D:
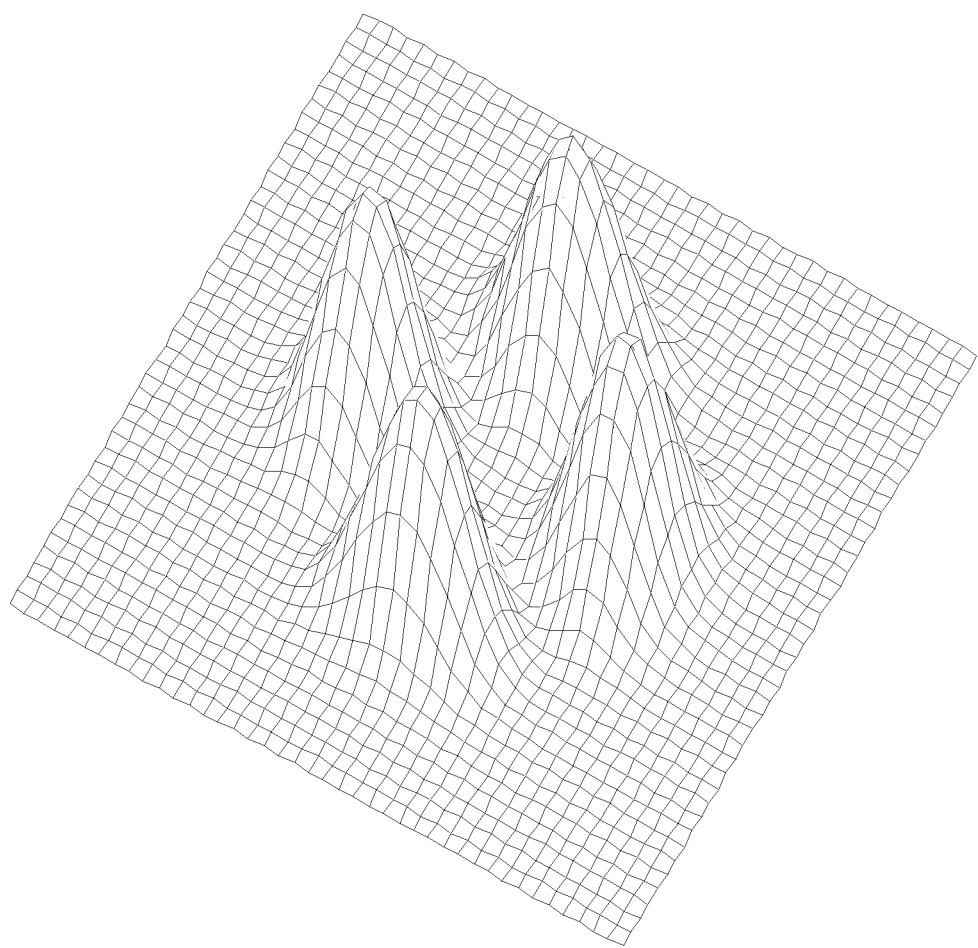

Thus, the beam intensity profile at the output of a fiber, or another multimode waveguide, may vary in dependence on the accumulated inter-mode phase differences at the end of the fiber, and thus may have for example a very different shape for fibers of different length. For example, an equal-power superposition of radially-symmetric fiber modes LP01 and LP02 of a fiber having a 20 μm core diameter and 0.08 NA may have a 1D intensity profile that is illustrated in FIG. 12a in the case of a zero phase difference between their fields, or may have a very different 1D intensity profile when the phase difference between their fields is π radian, as illustrated in FIG. 12b.

Thus, the superposition of modal fields at a given distribution of optical power between the modes may result in a variety of intensity profile patterns, depending upon the relative phase difference $\Delta\phi_{mn}$ between the mode fields. One possible approach to resolving this ambiguity is to use a method modal decomposition wherein the relative mode phases are 'retrieved', i.e. self-consistently determined, in the modal decomposition process. However, known methods of phase-retrieving modal decomposition involve the use of complicated iterative algorithms that are not fast enough and/or insufficiently robust to use in real-time applications, such as for example in waveguide alignment, and in fiber alignment and splicing in particular.

A different method disclosed hereinbelow makes use of the modal and chromatic dispersion in the waveguide in combination with multi-wavelength measurements to substantially cancel out the contributions of the phase-dependent inter-modal interference at different wavelengths. In this method, the superposition of several fiber modes is effectively averaged over a plurality of different wavelengths after propagating through the fiber, producing a multi-wavelength beam intensity profile that closely approximates a superposition of mode intensity patterns of the respective modes. The desired averaging may be achieved for example by launching into the multimode fiber a broadband light of a suitable bandwidth $\Delta\lambda$ and using a photodetector (PD) array (PDA) to capture a multi-wavelength beam intensity profile (MWBIP) F(x,y), which is also referred to herein as the wavelength-averaged beam intensity profile (BIP), at the fiber output. Assuming a flat wavelength spectrum of the input light and approximately wavelength-independent modal fields, the contribution K(x,y) of the inter-modal interference in the multi-wavelength beam intensity profile F(x,y) is approximately proportional to an integral of the inter-model phase terms, e.g. as defined by equations (2), over all launched wavelengths, as described by the following equation (3):

$$K(x, y) = 2\text{Re}\left\{\sum_{n\neq m} c_n c_m^* f_n(x, y) f_m^*(x, y) \int_\lambda \exp(i\Delta\varphi_{nm}(\lambda))\right\} \quad (3)$$

Because of the chromatic dispersion in the fiber that adds to the fiber modal dispersion, light of different wavelengths experiences different phase delays in the fiber, so that the inter-modal phase difference $\Delta\phi_{mn}=(\phi_m-\phi_n)$ between optical phases of two fiber modes at the fiber output end has different values at different light wavelengths $\lambda$, typically varying approximately linearly with $\lambda$. If the bandwidth $\Delta\lambda$ of the input light is sufficiently large so that $\Delta\phi_{nm}$ varies by $2\pi$ radians or more across the wavelength range of the input light, the contributions of the phase-dependent inter-modal interference patterns of different wavelengths into the multi-wavelength beam intensity profile at the output of the fiber, which is represented by the integral over the wavelength $\lambda$ in the RHS of equation (3), may average out to close to zero. The multi-wavelength beam intensity pattern F(x,y) captured at the fiber output may then be approximated by a weighted sum of intensity profiles $I_n(x,y)$ of beams originating from individual fiber modes:

$$F(x, y) = \sum_n |c_n|^2 \cdot |f_n(x, y)|^2 = \sum_n p_n \cdot I_n(x, y) \quad (4)$$

Accordingly, the mode content of a fiber output beam may be estimated by comparing the multi-wavelength beam intensity profile to the one or more mode intensity profiles (MIPs) In(x,y), which may be determined in advance, for example based on a known structure of the fiber.

In another embodiment, the multi-wavelength beam intensity profile F(x,y) wherein the phase-dependent inter-mode interference effects are averaged out may be obtained by summing up, or computing an average of, a plurality of substantially single-wavelength beam intensity profiles $F_k(x,y)=\{F(x,y)\}(\lambda_k)$ that are captured at a plurality of different wavelengths $\lambda_k$:

$$F(x, y) = \sum_k F_k(x, y,) \quad (5)$$

If the mode profiles f(x,y) are substantially wavelength-independent and the single-wavelength beam intensity profiles $F_k(x,y)$ are normalized to a same beam power, the contribution K(x,y) of the inter-modal interference in the multi-wavelength beam intensity profile F(x,y) may again be approximated by equation (3), but with the wavelength integration replaced by a summation over the plurality of wavelengths $\lambda_k$, $$\int_\lambda \exp(i\Delta\varphi_{nm}(\lambda)) \to \sum_k \exp(i\Delta\varphi_{nm}(\lambda_k)).$$

A suitable choice of the wavelengths $\lambda_k$, which includes for example a set of wavelengths that are densely spread across a wavelength range that is sufficiently broad that $\Delta\phi_{mn}$ varies by $2\pi$ or more thereacross, will again yield a mutual cancellation of the inter-mode interference terms at different wavelengths for which $\Delta\phi_{mn}$ differs by $\pi$, resulting in at least partial averaging out of the phase-dependent inter-modal interference.

Figure 3A:
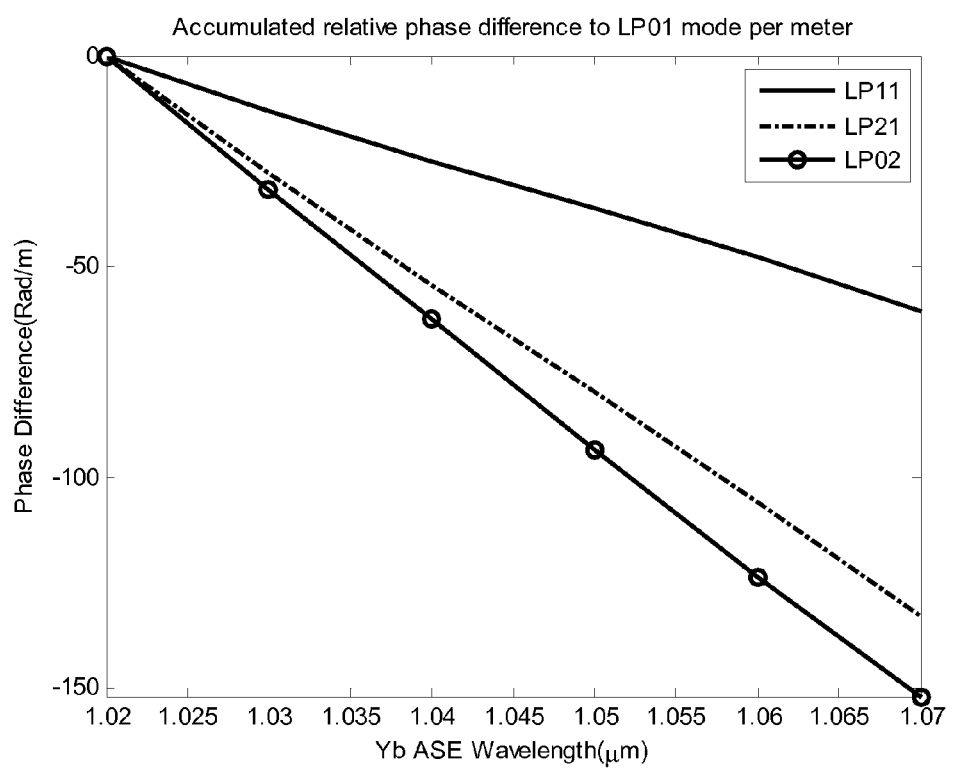
FIG. 3a is a graph illustrating the wavelength dependence of a relative phase of three higher order modes of an LMA fiber relative to the fundamental fiber mode that is accumulated over one meter of the LMA fiber at wavelengths near 1 µm.
Figure 3B:
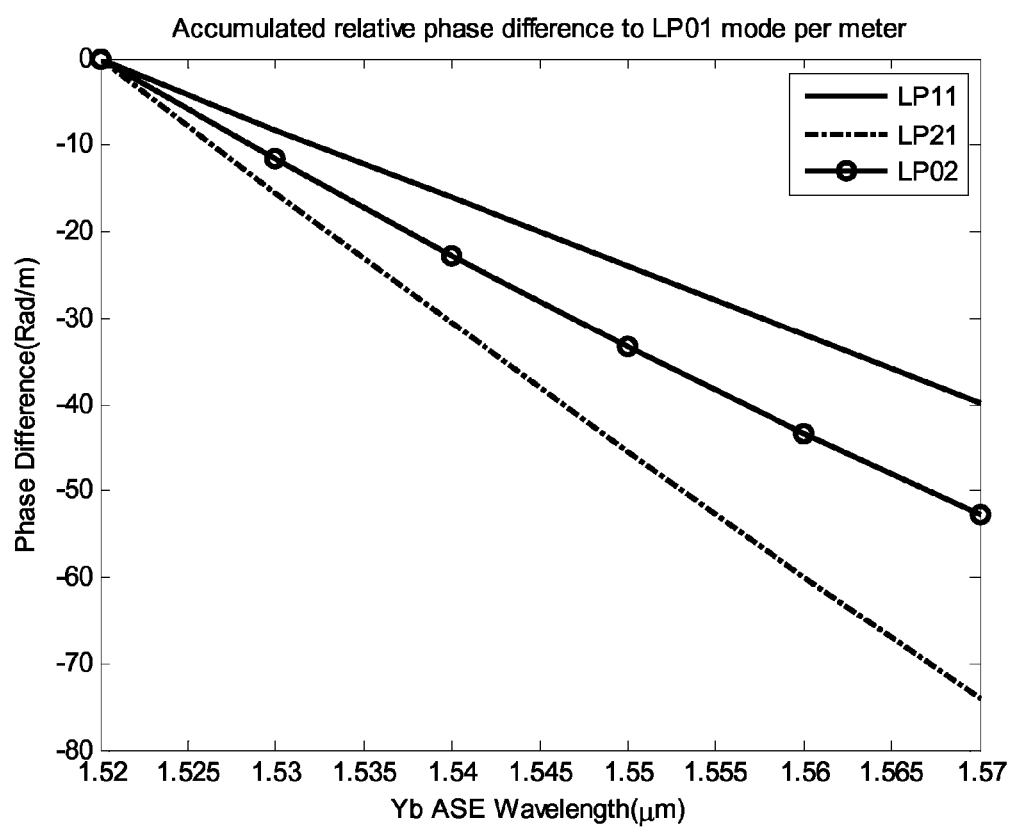
FIG. 3b is a graph illustrating the wavelength dependence of the relative phase of the three higher order modes of the LMA fiber of FIG. 9a relative to the fundamental fiber mode that is accumulated over one meter of the LMA fiber at wavelengths near 1.5 µm.

Referring to FIGS. 3a and 3b, there is shown by way of example how the relative phase differences $\Delta\phi_{1m}$ between a fundamental waveguide mode (n=1) and three HOMs of an LMA fiber vary across a 50 nm wavelength window. The plots are shown for propagation over one meter of a typical LMA fiber having the numerical aperture NA=0.08 and 30 μm core diameter. The fundamental mode is the LP01 mode, and the three HOM are LP11, LP21 and LP02 modes. FIG. 3a shows the variation in $\Delta\phi_{1m}$ across a 50 nm wavelength range at wavelengths λ near 1 μm, which corresponds to an amplified spontaneous emission (ASE) source using an Yb-doped fiber, while FIG. 3b shows $\Delta\phi_{1m}(\lambda)$ for λ near 1.5 μm, which corresponds to an ASE source based on an Er-doped fiber, with Δλ~50 nm being a typical bandwidth of a fiber-based ASE source. As can be seen from the figures, the accumulated phase difference between each of the three HOM and the fundamental mode can vary by more than 10*π per meter over the 50 nm wavelength range, or by more than 6*π per meter over a 30 nm wavelength range. Since $$\int_0^{2\pi} e^{i\Delta\varphi} \cdot d\Delta\varphi = 0,$$

this may be sufficient to substantially eliminate, or at least significantly suppress, the contribution of the phase-dependent inter-mode interference into the multi-wavelength beam intensity profile through the wavelength averaging of the phase-dependent contribution.

Once the phase differences are averaged out, the modal composition of the multi-wavelength intensity profile may be estimated simply by comparing the multi-wavelength beam intensity profile to beam intensity profiles $I_n(x,y)$ of individual waveguide modes, which are referred to herein as the mode intensity profiles (MIP), using a computer executing a relatively simple computer algorithm. Mathematically, using this approach the task of modal decomposition of a beam at the output of a multi-mode waveguide may be reduced to the task of finding one or more real-valued non-negative weighting coefficients of a weighted sum of the mode intensity profiles that fits the multi-wavelength intensity profile of the beam. In one exemplary embodiment, a conventional two-dimensional (2D) least-square-fitting (LSF) algorithm, which may be relatively simple and efficiently implemented as known in the art, may be used to retrieve power ratios $p_n$ for different waveguide modes contributing into the output beam, thereby providing a fast and robust method of modal decomposition analysis and estimating beam and/or input alignment quality, which is amenable to real-time implementations.

Figure 4:
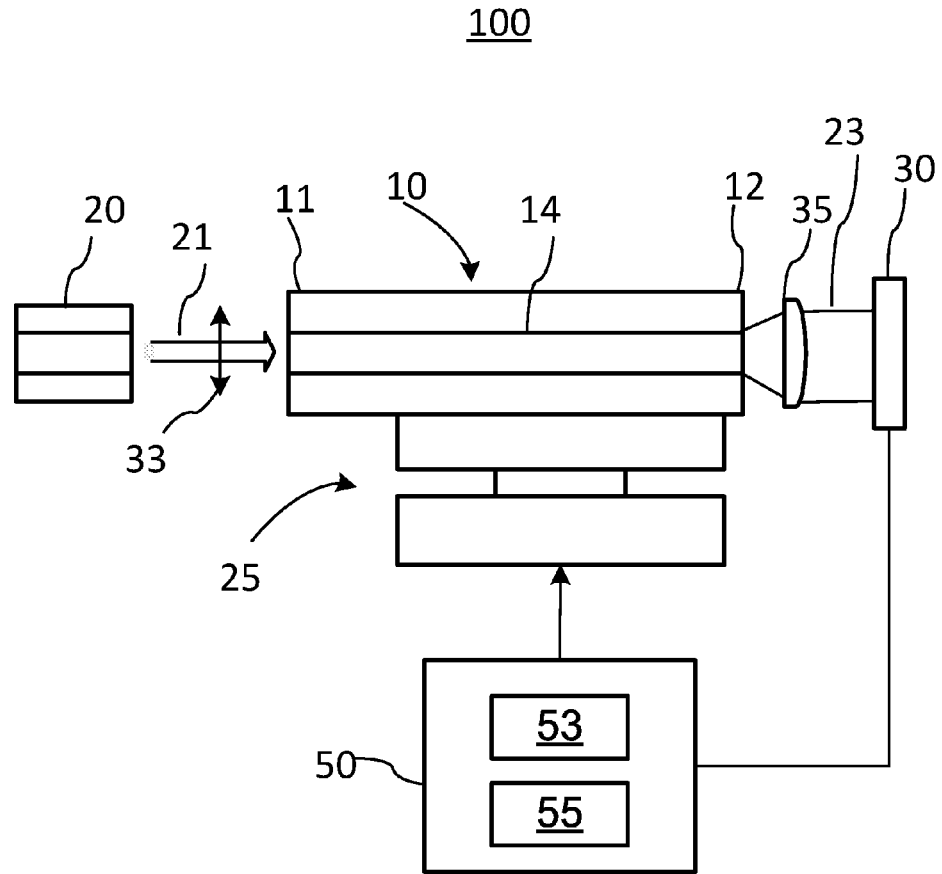
FIG. 4 is a schematic block diagram of a system capable of analyzing modal composition of an output beam from a multimode waveguide.

One or more embodiments of the method will now be described first with reference to a flowchart of FIG. 7 and a block diagram of FIG. 4. Referring first to FIG. 4, there is schematically illustrated an exemplary system 100 that is configured to implement various steps of the method of FIG. 7, and possibly other optional steps some of them are also described hereinbelow. In system 100, a multi-wavelength light source (MWLS) 20, which may also be referred to herein simply as source 20, is disposed to launch light 21 at a plurality of wavelengths into a first end 11 of a multimode optical fiber 10, or another multimode waveguide. The multimode fiber 10 will also be referred to herein as the first fiber or the first waveguide.

A fiber holder 25, which is also referred to herein as the waveguide holder, is configured to accept the fiber 10, or at least its first end 11, and to hold it in a position of approximate alignment with the multi-wavelength source 20, wherein at least a portion of the multi-wavelength light 21 emitted by the source 20 is coupled into the core 14 of fiber 10 at the first fiber end 11. A photodetector array (PDA) 30 is disposed at the second end 12 of the fiber 10, and is optically coupled thereto, optionally using a lens or lens system 35, to receive an output light beam 23 emitted from the second end 12 of the fiber 10, which is also referred to herein as the fiber output beam. The first and second ends 11, 12 of the fiber 10 may also be referred to herein as the input and output fiber ends, respectively. The optionally lens or lens system 35 may be configured to form a cross-sectional image of the beam 23 upon the PDA 30, for example in a near-field or a far-field view.

Figure 5:
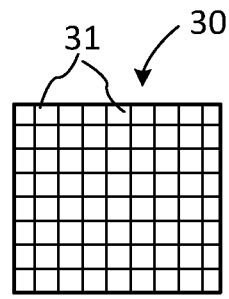
FIG. 5 is a schematic diagram of a photodetector array used in the system of FIG. 1.

The PDA 30 may be a 2D array of photodetector (PD) elements 31 as illustrated in FIG. 5. When the fiber output beam 23 impinges upon the PDA 30, electrical signals from the PD elements 31 together provide a discrete "snapshot", or a pixelated 2D image, of a beam intensity profile F(x,y) of the fiber output beam 23. Here, (x,y) are Descartes coordinates in a plane of a photo-sensitive surface of the PD array 30, which may or may not be normal to the direction of beam propagation. The PD array 30 may be embodied, for example, using a CCD camera, an array of photodiodes, or any other suitable PD array capable of capturing a 2D intensity profile of the fiber output beam 23.

The electrical output from the PDA 30 is provided to a computer 50, which includes a processor 53 and a MIP source 55. In one embodiment, the MIP source 55 is in the form of non-volatile memory, which is also referred to herein as the first memory and which stores one or more pre-determined MIPs that correspond to one or more of waveguide modes of the multimode fiber 10; it may be embodied using any suitable non-transitory memory device such as but not exclusively an optical memory disk or a solid-state memory chip. In another embodiment the MIP source 55 may, for example, represent or include a software module that generates the one or more MIPs for one or more modes of fiber 10 in real time based on known fiber parameters; efficient computer programs that are capable of computing eigen modes of optical fibers are known in the art and commercially available. The computer 50 may be embodied using a general purpose computer, a microcontroller, or any suitable computing device having an input port compatible with the electrical output of the PDA, and may include features as generally described hereinbelow with reference to FIG. 11.

The computer 50 may be configured, for example using software and/or hardware logic, to analyze the fiber output beam 21 by processing beam intensity profiles captured by the PDA 30, as described hereinbelow. In one embodiment, it may be configured to analyze a mode content of the fiber output beam 23, i.e. the fraction $p_n$ of the total optical power P of the fiber output beam 23 that is contained in each of the one or more modes of the fiber 10, based on a multi-wavelength beam intensity profile and the one or more MIPs of the fiber 10 provided by the MIP source 55. In one embodiment, the computer 50 may be configured to provide, based on the mode content analysis, a beam quality value (BQV). In one embodiment, the BQV may characterize an input alignment of the fiber 10, i.e. the alignment of the input beam 21 with respect to the fiber core 14 at the input end 11 of fiber 10; accordingly, the BQV may also be referred to as an alignment quality value (AQV) and may be used to guide waveguide or fiber alignment to a light input.

The MWLS 20 is configured to emit a plurality of light wavelengths 151 that span a wavelength range 155 of width Δλ, as schematically illustrated in FIG. 5. The width Δλ of the wavelength range 155, which is also referred to herein as the bandwidth of the input light 21 or as the source bandwidth, should be large enough to effect the averaging out of the inter-modal interference effects in the beam intensity profile at the PDA 30 over the plurality of wavelengths 151. Concrete values of the bandwidth Δλ that may be sufficient for the desired wavelength averaging effect may depend on the modal and chromatic dispersion in the fiber 10 and on its length. By way of example, Δλ of about 30 nm or greater may be suitable for typical LMA fibers used in high-power fiber lasers, with Δλ of about 50 nm or greater being more preferable. It may also be preferable that the wavelength range 155 does not include a mode cut-off, which may put an upper limit for the source bandwidth Δλ. The MWLS 20 may be embodied using light sources having broad-band or comb-like emission spectrum, and sources of narrow-band wavelength-tunable light. Examples of suitable broad-band light sources include, but may not be limited to, fiber-based sources of amplified spontaneous emission (ASE), super-luminescent semiconductor diodes, and pulsed super-continuum light sources, all of which are available commercially.

Figure 6:
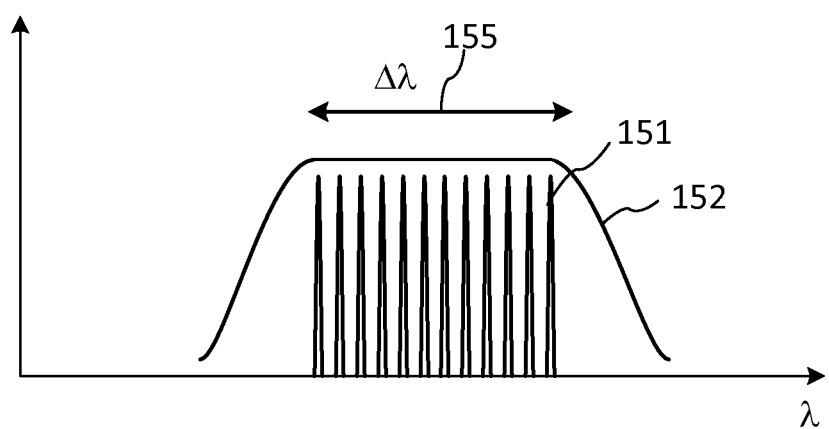
FIG. 6 is a schematic diagram illustrating a range of light wavelength launched in the multimode waveguide of FIG. 3.

Hereinbelow embodiments are firstly described wherein the MWLS 20 is a broad-band light source. In such embodiments, the plurality of light wavelengths 151 fill the wavelength range 155 substantially in a continuous or quasi-continuous fashion, forming a continuous, preferably flat-top, spectral band 152 as schematically illustrated in FIG. 6. In such embodiments, computer 50 obtains the multi-wavelength beam intensity profile (MWBIP) $F(x,y)$ directly from a beam image that is captured by the PD array 30, as it combines contribution from the plurality of light wavelengths 151.

In one exemplary embodiment the MWLS 20 may be a continuous-wave (CW) ASE source that emits broad-band light 21 in a bandwidth Δλ~50 nm. ASE sources are commercially available for different wavelength ranges, for example with a central wavelength around 1 micrometer (μm), 1.5 μm, or 2 μm, with a typical emission bandwidth of 50 nm; either of them could be used in different embodiments of the system 100. By way of example, a 1.5 μm ASE source may be a suitable choice for the MWLS 21 when fiber 10 is Yb-doped, since the Yb-doped fiber and the air are both transparent at 1.5 μm. In addition, the multimode fiber 10 supports fewer waveguide modes for 1.5 μm light than for 1 μm light, which may be advantageous in practical implementations to speed up the computations. Other embodiments may use multi-wavelength sources that emit radiation in a different wavelength region, depending for example on the mode properties and material dispersion of the fiber 10.

Figure 7:
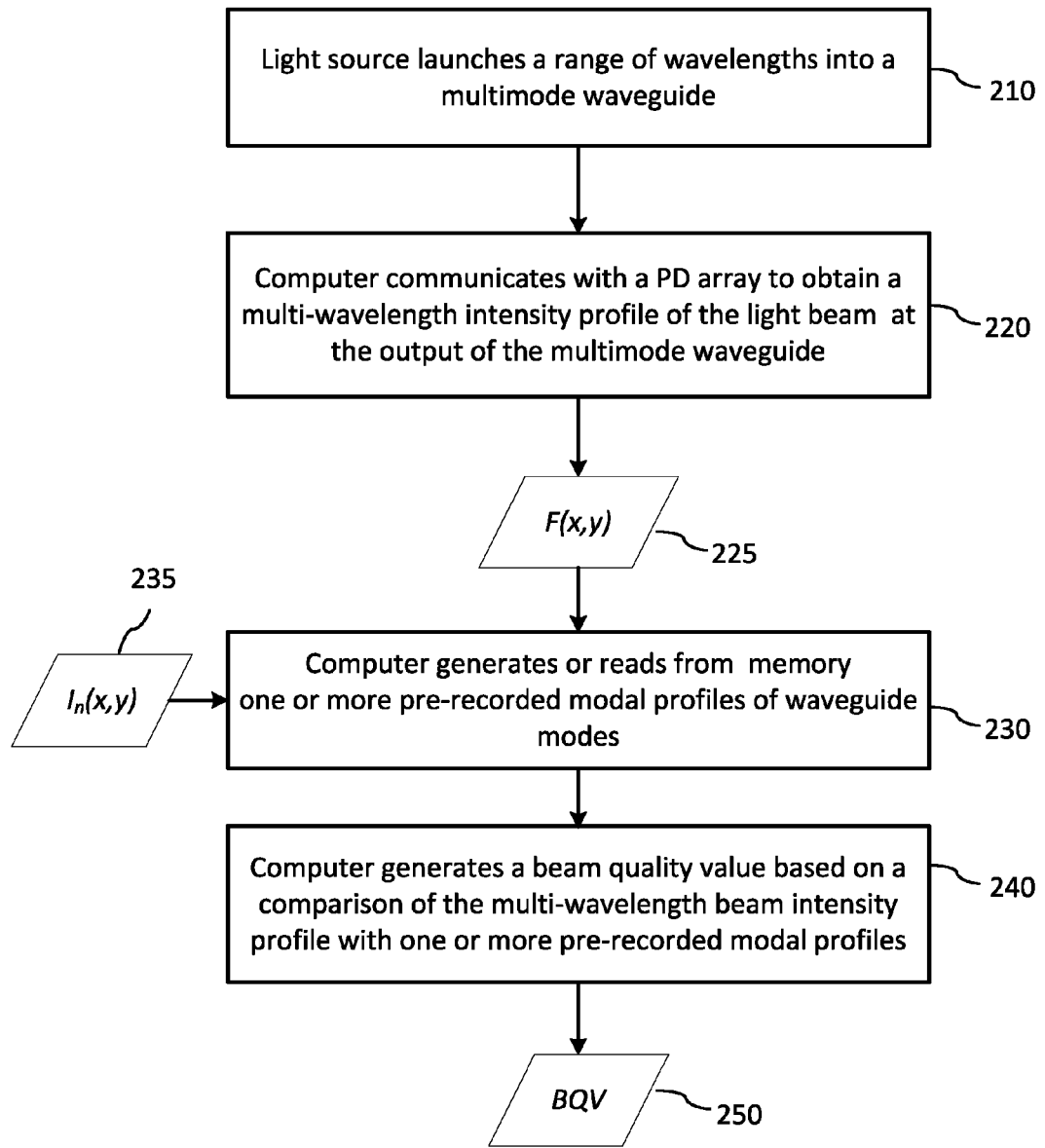
FIG. 7 is a flowchart of a method wherein modal composition of an output beam from a multimode waveguide is analyzed.

Referring now also to FIG. 7, in one embodiment the system 100 may be configured to analyze the fiber output beam 23 generally as follows. At step 210, the multi-wavelength light source 20 launches the plurality of wavelengths 151 into the multimode fiber 10. This step may be preceded by bringing the light source 20 and the first end 11 of the fiber 10 to a relative position of at least approximate mutual alignment, so that light 21 emitted by the source 20 is at least partially coupled into the core 14 of fiber 10, which may be indicated by a presence of a photo-signal from the PD array 30. At step 220, the computer 50 communicates with the PDA 30 to obtain a multi-wavelength beam intensity profile (MWBIP) 225. At step 230, the computer 50 obtains the one or more pre-recorded MIPs $In(x,y)$ 235 from MIP source/memory 55. Each of the one or more MIPs $In(x,y)$ may either be computed in real time or pre-computed based on known parameters of fiber 10 and output optics 35, or may be pre-measured for example by coupling the input light 21 into the fiber 10 so as to excite substantially exclusively a corresponding fiber mode. In one embodiment, the pre-computed or pre-measured mode intensity profiles $I_n(x,y)$ may be recorded in memory 55 at a calibration stage, for example as a 2D array or in any other suitable form. Exemplary intensity profiles of four fiber modes of an LMA fiber having a 30 μm core and a numerical aperture NA=0.08 are illustrated in FIGS. 13*a-d*.

At step 240, the computer 50 performs a comparison of the multi-wavelength beam intensity profile 225 with the one or more pre-recorded mode intensity profiles 235. This comparison may include comparing the multi-wavelength beam intensity profile 225 to one of the pre-recorded mode intensity profiles 235 or to a superposition of two or more of the pre-recorded mode intensity profiles 235, and may include executing a fitting algorithm to find a weighted superposition of the mode intensity profiles $I_n$ that matches the MWBIP 225, as described more in detail hereinbelow. Based on results of this comparison, computer 50 may generate a beam quality value (BQV) 250. In one embodiment, BQV 250 may be based on a distribution of the optical power of the beam 23 among the one or more fiber modes. In one embodiment, BQV 250 may be based on a fraction of the beam power in one or more selected fiber modes. In one embodiment, BQV 250 may be a fraction of the beam power in a fundamental mode of the fiber 10. In one embodiment, this fraction may be determined by estimating an overlap between the MWBIP 225 $F(x,y)$ and the MIP $I_1(x,y)$ corresponding to the fundamental mode of the fiber 10, which may include computing an overlap integral therebetween. In one embodiment, the computer may output the BQV 250 to a computer display (not shown) for displaying to a user. In one embodiment, the user may use the displayed BQV as a guide to adjust the input alignment of the fiber 10. In one embodiment, the fiber holder 25 may include, or be in the form of a motorized computer-controlled fiber positioning system that is operatively coupled to the computer 50, which may control the fiber holder 25 so as to improve the alignment between the fiber 10 and the source 20 using the BQV 250 as a feedback in an automated alignment procedure.

In embodiments wherein the MWLS 20 is a broad-band or comb-like light source, step 210 may include using the PDA 30 to capture a cross-sectional image of the output light beam 23, and the computer 50 using said cross-sectional image, or image data obtained therefrom, for example by digitizing and normalizing, as the multi-wavelength beam intensity profile 225.

In another embodiment, MWLS 20 may be in the form of a wavelength-tunable light source which output wavelengths can be tuned across a desired wavelength range. In this embodiment, step 210 may include continuous or step-wise tuning of the wavelength of light 21 in the desired wavelength range 155 over a period of time, with the computer 50 during the same time period sequentially recording a plurality of beam intensity profiles $F_k(x,y)$, each corresponding to a different light wavelength $\lambda_k$ from the plurality of light wavelengths 151. The computer 50 may then compute the MWBIP 225 by summing up the plurality of the recorded 'single-wavelength' beam intensity profiles $F_k(x,y)$, in accordance with equation (5).

In one embodiment, the MIP source 55 may store or generate a plurality of MIPs $I_n$ 235 corresponding to a plurality of waveguide modes of fiber 10, and the comparison in step 240 may include estimating relative contributions of one or more of these waveguide modes into the optical power P of the output beam 23.

Figure 8:
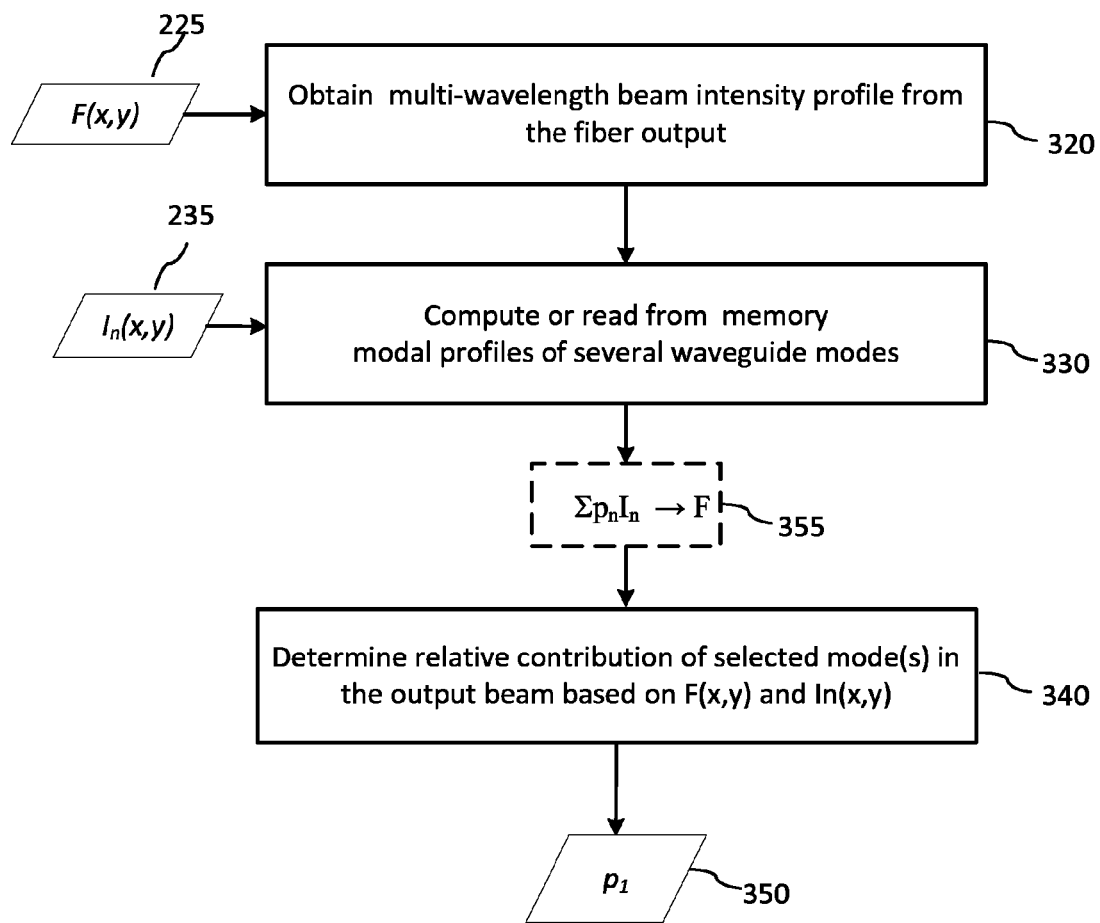
FIG. 8 is a flowchart showing several computer-implemented steps of the method of FIG. 6 in one embodiment thereof.

Referring to FIG. 8, computer 50 may be configured to execute the following operations: a) obtaining the MWBIP 225 in cooperation with the PDA 30 at step 320; b) reading the pre-recorded beam intensity profiles In 235 from memory at step 330; c) determining, based on the multi-wavelength beam intensity profile 225 $F(x,y)$ and the plurality of MIPs $I_n(x,y)$ 235, a relative contribution of a selected waveguide mode from the plurality of the waveguide modes into the optical power of the light beam at step 340. Step 340 may be preceded, or include, executing a fitting algorithm or operation 355 that determines weighting coefficients $p_n$ in a weighted sum of the $$MIPs\ 235 \sum_k p_n \cdot I_n(x, y)$$

that best fits the MWBIP F(x,y) 225. Such fitting algorithm may, for example, seek to minimize a norm D of a 2D array representing the difference $$\sum_n p_n \cdot I_n(x, y) - F(x, y):\ D = \left\| \sum_n p_n \cdot I_n(x, y) - F(x, y) \right\|, \quad (5)$$

where In(x,y) and F(x,y) may be in the form of 2D arrays, and may be normalized to a same total power. During the execution of the fitting operation 355, the weighting coefficients $p_n \geq 0$ are adjustable fitting parameters that are varied by the fitting operation in order to find their combination that minimizes the norm D. After the execution of the fitting operation 355, the relative contribution of a selected mode in the output beam 23 may then be determined based on a corresponding weight coefficient $p_n$, and the computer 50 may record or otherwise use its value as the BQV 250. The selected mode may be for example the fundamental mode of the fiber 10, but may also be any other of the fiber modes that may be of interest in a particular application.

It will be appreciated that, although waveguide modes are often described by two indexes, the summation index 'n' in the RHS of equation (5) should be understood as a counter of all such modes. Furthermore, eigen modes of typical optical fibers may also be characterized by an orientation angle $\theta_n$ as known in the art, and the fitting may also be performed with the mode orientation angle or angles $\theta_n$ as additional fitting parameters. Furthermore, although the notations used hereinabove represent the MWBIP F 225 and the MIPs In(x,y) 235 as functions of Descartes coordinates (x,y) in the plane of the light receiving face of PDA 30, the computer 50 may store the MIPs 235 as two dimensional arrays or in any other suitable way, including as discrete functions of polar coordinates (r, φ).

In one embodiment the plurality of MIPs 235 stored or generated by MIP source 55 may correspond substantially to a plurality of LPml fiber modes of the fiber 10, where 'LP' stands for 'linear polarized, and 'm' and 'l' are integer mode indexes, with the LP01 being the fundamental mode. As known in the art, the LPml modes are modes of optical fibers with radially symmetric index profiles in the approximation of weak guidance. LP0y modes are rotationally symmetric, while each of LPxy modes with non-zero first index 'x' is composed of a pair of degenerate modes, do not have a rotational symmetry and therefore are characterized by an orientation angle θ in the (x,y) plane. In one embodiment the plurality of MIPs 235 may include the fundamental mode LP01, and one or more higher-order LP modes, such as LP02, LP11, LP21, LP31, etc. While the fitting algorithm 355 may use one 'power' fitting parameter $p_n$ for each rotationally-symmetric LP0x mode, each LP-group of degenerate modes may in some cases require two power fitting parameters and one orientation angle fitting parameter, if the so called "doughnut" modes need to be accounted for. However, in practice launching light 21 into fiber 10 from one end thereof would typically excite only static modes for regular LMA fibers, and the fitting algorithm 355 may use two fitting parameters for each of the degenerate LP modes, one for the mode power ratio $p_n$, and one for the orientation angle $\theta_n$.

By way of example, fiber 10 may be an LMA fiber having a 30 μm diameter core and the numerical aperture NA=0.08. In the wavelength range λ~1 μm such fibers can support seven LP modes, two of which are rotationally-symmetric LP0x modes and five degenerate modes. Accordingly, in embodiments wherein the source 20 emits in the 1 μm wavelength range, MIP source 55 may store or generate mode intensity profiles corresponding to these seven LP modes, and the fitting algorithm 355 may use 7 'power' fitting parameters and 5 angle fitting parameters, for a total of 12 fitting parameters. However, at wavelength in 1.5 μm range the same fiber supports only four LP-mode, so that the fitting algorithm 355 may use only 6 independent fitting coefficients. Thus, in this example using a 1.5 μm light source instead of 1 μm light source as the MWLS 20 lowers the number of fitting coefficients from 12 to only 6, which improves the speed and robustness of the fitting process. In one embodiment these 6 fitting parameters may be as follows:

1. A_01: Power ratio ($p_1$) of LP01 mode with value between 0 and 1;
2. A_11: Power ratio ($p_2$) of LP11 mode with value between 0 and 1;
3. Θ_11: Orientation angle ($\theta_2$) of LP11 mode with value between 0° and 90°;
4. A_21: Power ratio ($p_3$) of LP21 mode with value between 0 and 1;
5. Θ_21: Orientation angle ($\theta_3$) of LP21 mode with value between 0° and 90°;
6. A_02: Power ratio ($p_4$) of LP02 mode with value between 0 and 1.

Figure 14A:
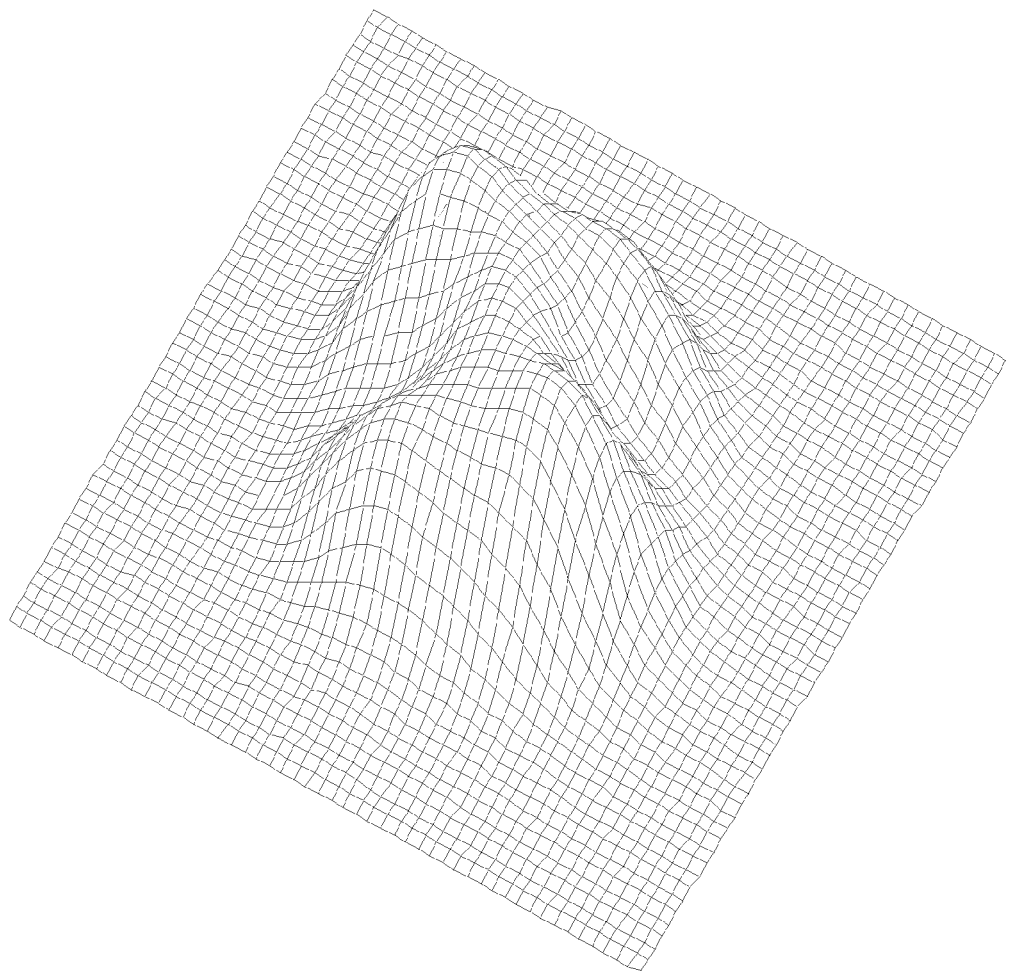
FIG. 14a is a graph showing an intensity profile of an exemplary superposition of the four fiber modes illustrated in FIGS. 13a-13d.
Figure 14B:
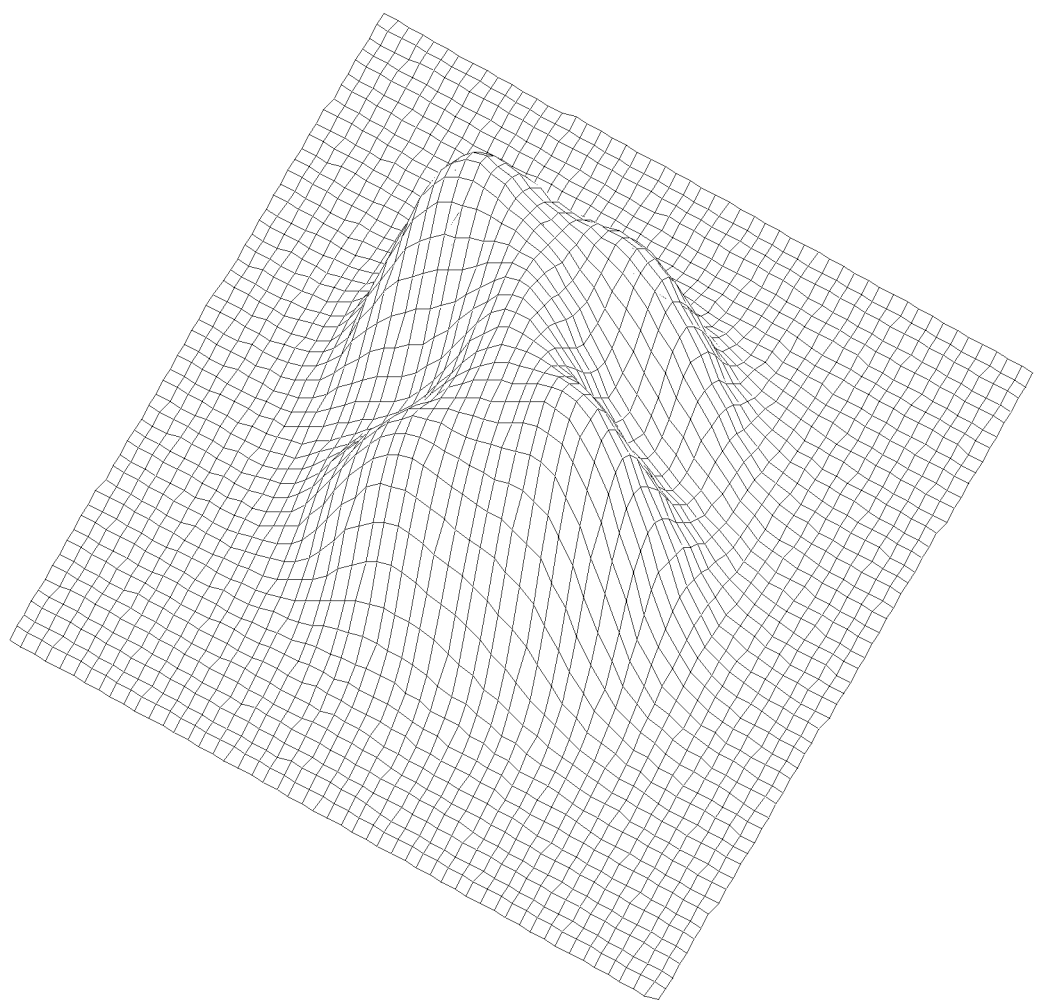
FIG. 14b is a graph showing a matching intensity profile which is obtained for the exemplary intensity profile of FIG. 14a using an LMS-based fitting algorithm and the four fiber modes illustrated in FIGS. 13a-13d.

Intensity profiles of the four fiber modes LP01, LP02, LP11 and LP21 for an exemplary LMA fiber having a 30 μm core and a numerical aperture NA=0.08 are illustrated in FIGS. 13a-d. The fitting procedure 355 searches for values of the six fitting parameters, which may be represented by a vector of fitting parameters V=[A_01, A_11, Θ_11, A_21, Θ_21, A_02], that minimize a norm of a difference between a MWBIP F(x,y) 225 obtained from the PDA 30 and a weighted sum SUM={A_01*I_01(x,y)+A_11*I_11(x,y; Θ_11)+ A_21*I_21(x,y; Θ_21)+A_02*I_02(x,y)}, where I_01(x,y), I_11(x,y; Θ_11), I_21(x,y; Θ_21) and I_02(x,y) are the MIPs 235 of the four fiber modes. By way of example, a simple LSF-based MATLAB™ fitting program implementing the fitting procedure 355 took less than a minute to determine these fitting coefficients with the accuracy of about 1% or better for an exemplary simulated MWBIP 225 illustrated in FIG. 14a, using pre-computed 2D MIPs for the modes LP01, LP11, LP21, and LP02 of a model LMA fiber with NA=0.08 and 30 μm core, which are illustrated in FIGS. 13a-d. FIG. 14b illustrates an intensity profile of a weighted superposition of the four modes obtain by the fitting procedure, which closely reproduces the original MWBIP illustrated in FIG. 14a.

Advantageously, the beam analysis method described hereinabove does not require retrieving mode phase information and may be implemented using fast and efficient computer algorithms, such as least square based fitting algorithms for which efficient software implementations exist for many computer platform and languages. The method is therefore adaptable for real-time implementation, such as in source-waveguide alignment as briefly described hereinabove, and fiber-to-multimode fiber alignment.

Figure 9:
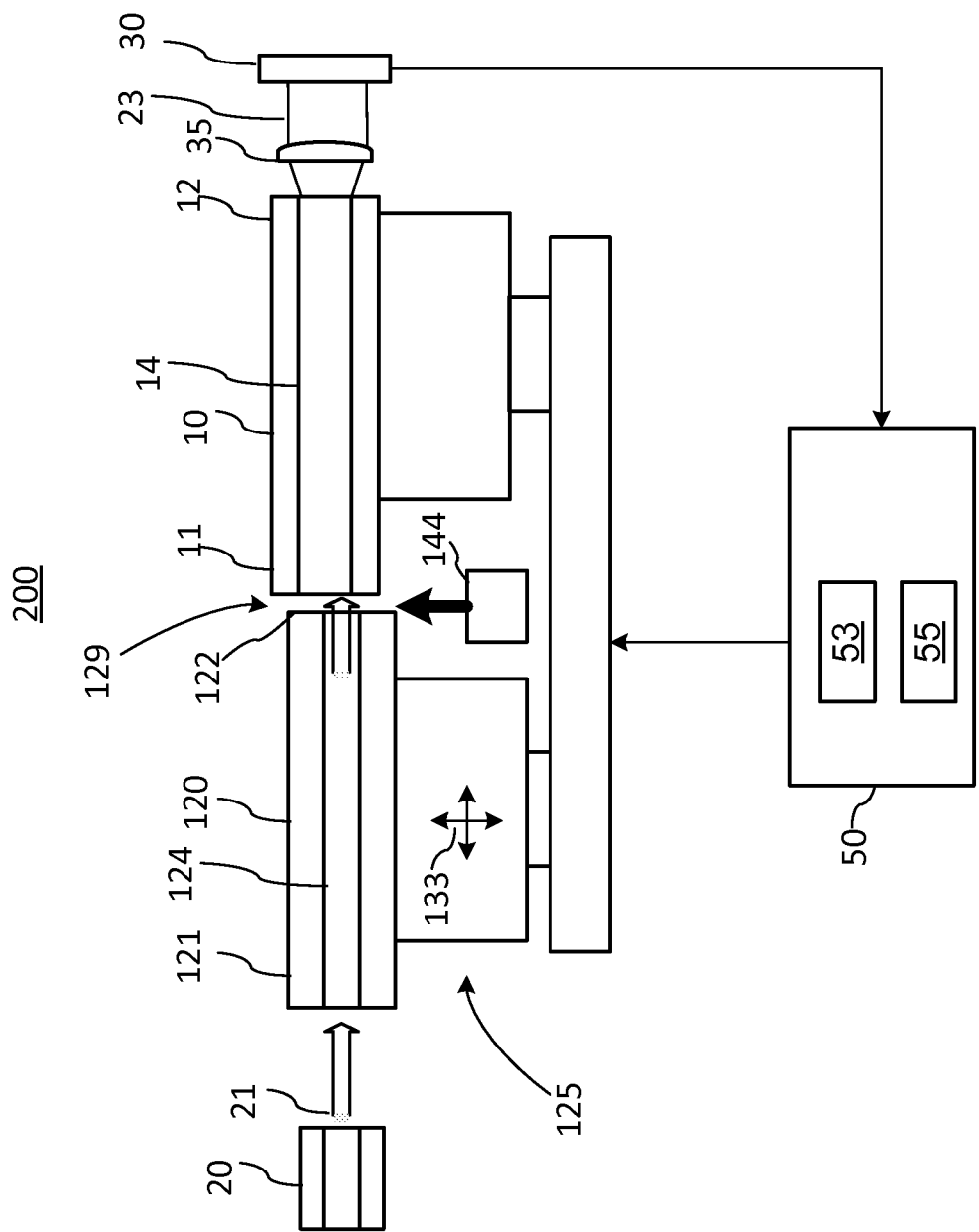
FIG. 9 is a schematic block diagram illustrating a system capable of analyzing input alignment to a multimode optical fiber.

Referring now to FIG. 9, there is illustrated a system 200 that may be used for aligning the first fiber 10 and a second fiber 120 that is disposed in front of the first fiber 10. Fibers 120 and 10 may also be referred to in this embodiment as the input fiber and the output fiber, respectively. While the first fiber 10 is multi-mode, the second fiber 120 may be either single-mode or multi-mode. The fibers may be positioned in a waveguide holder 125 so that an output end 122 of the second fiber is in a close proximity with the input end 11 of the first waveguide 10, so as to provide an optical coupling therebetween. By way of example, the distance between fiber ends 122, 11 at a junction 129 may initially be in the range from about 1 μm to about 1 mm. The MWLS 20, which may be generally as described hereinabove with reference to FIGS. 4 and 6, is disposed to launch light 21 at the plurality of wavelengths 151 into the first end 121 of the second fiber 120. Depending on the mutual alignment of the fiber ends 122 and 11 and the alignment between the source 20 and the first end 121 of the input fiber 120, light 21 may excite the fundamental fiber mode and/or one or more HOMs of the fiber 10. Similar to system 100 of FIG. 4 described hereinabove, the PDA 30 is optically coupled to the fiber 10 using the optional lens or lens system 35 so as to receive the fiber output light beam 23 from the output fiber end 12. In response to receiving the beam 23, PDA 30 produces electrical signals carrying cross-sectional image of the fiber output beam 32. The PDA 30 may be as described hereinabove with reference to FIGS. 4 and 5.

Figure 2A:
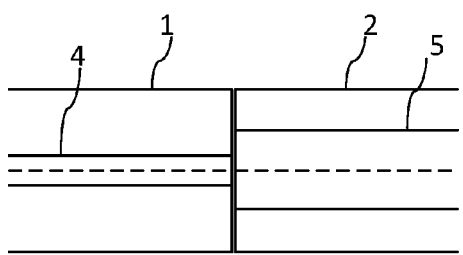
FIG. 2a is a schematic diagram illustrating ideal fiber alignment of two optical fibers having differing core diameters.
Figure 2B:
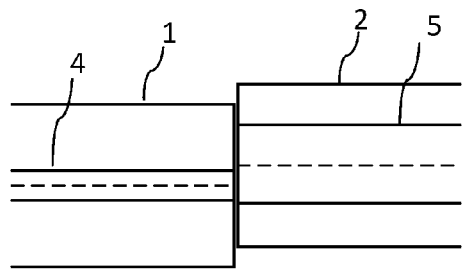
FIG. 2b is a schematic diagram illustrating off-axis fiber alignment of two optical fibers having differing core diameters.

The electrical output from the PDA 30 is provided to a computer 50 that includes the processor 53 and the MIP source 55 that stores one or more pre-determined mode intensity profiles $I_n(x,y)$ 235. The computer 50 may be configured to receive the beam image signals from the PDA 30, to analyze the mode content of the beam based on the beam image data and the saved mode intensity profiles 235, and to generate a BQV based on the mode content of the beam, substantially as described hereinabove with reference to system 100 of FIG. 4 and to flowcharts of FIGS. 7 and 8. Specifically, the mode content of the beam 23 may depend on the alignment of the core 124 of the second fiber 120 relative to the core of the first fiber 10. In particular, an off-axis fiber alignment as schematically illustrated in FIG. 2b, or when the fiber axes are at an angle at the junction 129, may generally result in a comparatively less efficient coupling of light from the second fiber 120 into the fundamental mode of the first fiber 10, and a comparatively more efficient coupling of light into the HOMs of fiber 10. Therefore, a BQV that, for example, indicates a relative power of the fundamental mode in the output beam 23, may be used to guide a process of aligning the first and second fibers 10, 120.

The waveguide holder 125 may be in the form of a motorized computer-controlled waveguide or fiber positioning system that is adapted for holding the second fiber 120 and the first fiber 10 generally aligned at a junction 129 so that light from the second waveguide 120 may be coupled into the core 14 of the first waveguide 10 with an efficiency suitable for detecting the light at the output of the first fiber 10 by the PDA 30. The computer-controlled fiber positioning system 125 may include a controller (not shown) that is coupled to the computer 50 with a control link as known in the art. In one embodiment, the fiber positioning system 125 is configured to move, for example in response to receiving a control signal from the computer 50, the output end 122 of the second fiber 120 and/or the input end 11 of the first fiber 10 relative to each other so as to controllably vary their relative alignment at the junction 129, as indicated by double sided arrows 33 by way of example. Although the arrows 33 indicate movements along two orthogonal directions in the plane of the figure, the fiber positioning system 125 may be capable of moving the fibers along different directions and angles as known in the art. The motorized computer-controlled fiber positioning system 125 may be for example substantially as used in commercial fusion splicers with a computer control of fiber positioning and alignment.

Figure 10:
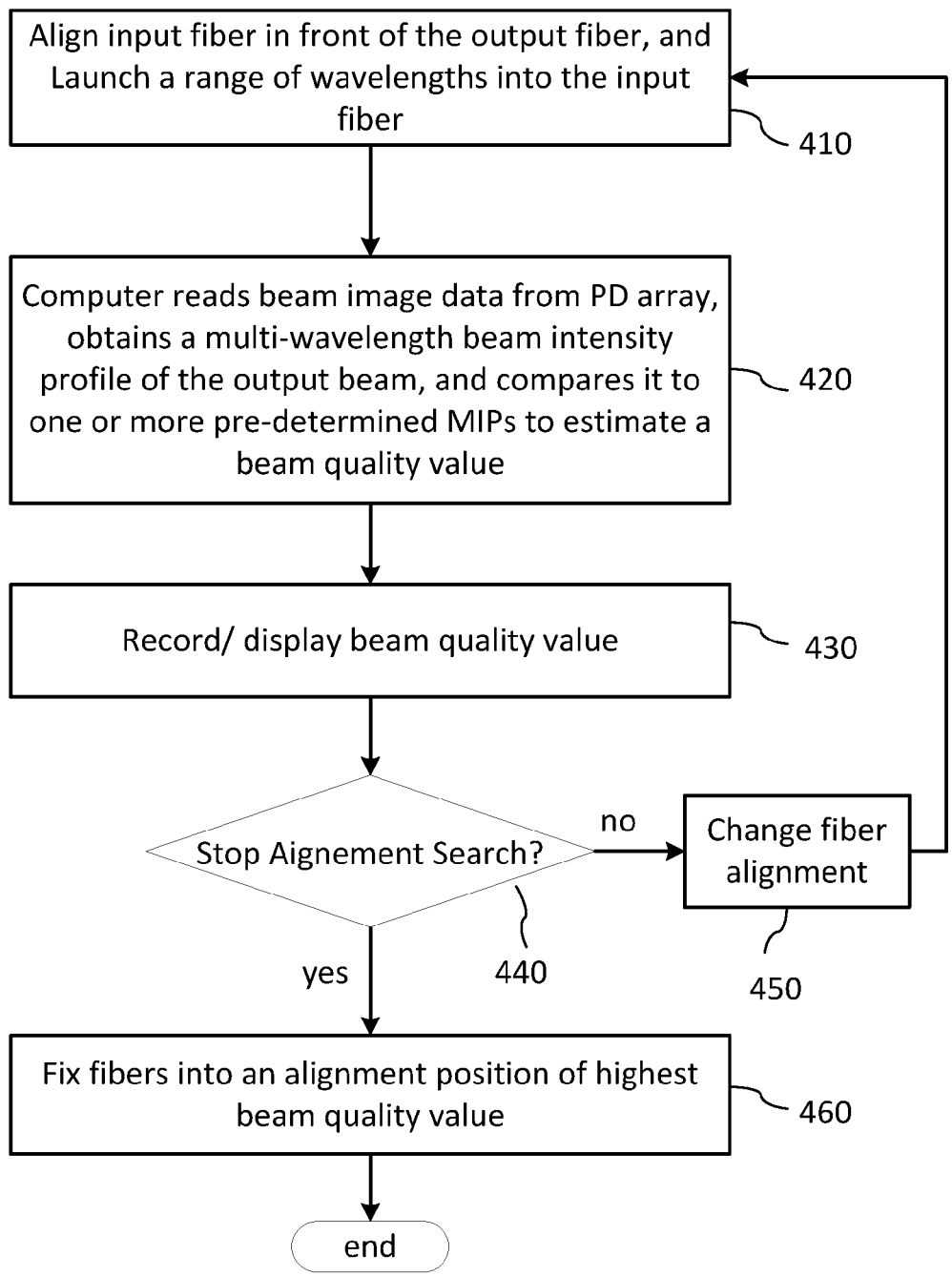
FIG. 10 is a flowchart of an embodiment of a method for waveguide alignment implemented by the system of FIG. 8.

Referring now to FIG. 10, there is shown a flowchart of one embodiment of a method of automatic fiber alignment that may be implemented with system 200. Each block in the figure represents an operation or process that may be performed by one or more elements of system 200. At step 410, the input fiber 120 and the output fiber 10 are positioned, using the fiber holder 25, into a position of initial alignment, in which a PDA-detectable portion of light 21 from the second fiber's output end 122 could be coupled into the core 14 of the first fiber 10 from its input end 11, and the MWLS 20 launches a range of light wavelengths 151 into the input fiber 120, as generally described hereinabove with reference to system 100 of FIG. 3. From the output end 122 of the second fiber 120 these light wavelengths 151 are coupled into the core 14 of the first fiber 10, propagate through the fiber 10 in one or more modes thereof, and reach PDA 30 as the fiber output beam 23. The PDA 30 converts the fiber output beam 23 impinging thereupon in a spatially resolved way into an electrical signal carrying beam image data. At step 420, computer 50 reads the beam image data from the electrical output of PDA 30, converts it into the MWBIP 225, compares the MWBIP 225 to the one or more predetermined MIPs 235 $I_n$ obtained from the MIP source 55, and determines a BQV for the fiber output beam 23 on the basis of this comparison, as generally described hereinabove with reference to FIGS. 3, 6 and 7. At step 430, the BQV may be displayed to a user, and/or recorded in computer memory in association with the current alignment position of the first and second fibers for which the current BQV was obtained. In one embodiment, the BQV may indicate the power ration $p_1$, or a percentage, of the optical power of the output beam corresponds to the fundamental mode of the fiber 10, and the beam profile processing in step 420 may include executing a fitting procedure to determine power weighting coefficients in a weighted sum of MIPs 235 that matches the MWBIP 225.

In one embodiment, steps 410-430 may be repeated for a plurality of different alignment positions between the first and second fibers 10, 120 to obtain a plurality of BQVs, and one of the plurality of different alignments that provides a highest BQV may be then selected as a preferred alignment, and relative positions of the output end 122 of the second fiber 120 and the input end 11 of the first fiber 10 may then be fixed according to the preferred alignment therebetween. In one embodiment, after the BQV value for a current fiber alignment position is recorded and/or displayed in step 430, a decision is made at 440 whether to stop the alignment search, or to continue and change the fiber alignment, for example by moving one of the proximate fiber ends 122, 11 into a new alignment position.

In one embodiment, step 420 may further include measuring a spectrum beating across the wavelengths range 155 of the broad-band source 20, as described for example in an article entitled "Spatially and spectrally resolved imaging of modal content in large-mode-area fibers"; Nicholson et al; Vol 16, No 10; May 12, 2008 Optics Express; pp. 7233-7243, which is incorporated herein by reference, and use the results of these measurements to improve the mode content estimations of the multi-wavelength intensity-fitting approach described hereinabove. In one embodiment, the spectrum-beating based technique may be used for a fine adjustment of the fiber alignment that is obtained using the intensity-fitting approach.

In one embodiment, the decision at 440 and, optionally, the fiber alignment change at 450 may be human controlled, depending on applications. In one embodiment, the feedback loop 410-420-430-440-450-410 may be automated, with the decisions at 440 and 450 made by the computer 50 executing a suitable search algorithm, possible implementations of which will be apparent to those skilled in the art. Advantageously, the intensity fitting procedure, which step 420 may utilize to determine the beam mode content and to obtain the BQV, may be implemented using fast and computationally robust computer algorithms that are known in the art. By way of example, one cycle of the automatic alignment process, from the beam image acquisition by the PDA 30 to the generation of the BQV value by the computer 50, is expected to take about 0.2-1 sec or less, thus enabling real-time operation and an automated alignment process.

In one embodiment, the method may further include fusing together the output end 122 of the second optical fiber 120 and the input end 11 of the first optical fiber 10 at a junction 129 using a fiber heating device 144 as known in the art. This fusing action may be performed in response to receiving from the computer 50 a control signal indicating that the first optical fiber 10 and second optical fiber 120 are in the position of the preferred alignment. The fiber heating device 144 may be embodied in various forms as known in the art, and is substantially a heating device, which may be arc based, gas flame based, or laser based, that heats the fiber ends at the junction 129 to a melting temperature. Commercially available fusion splicers may be used to provide the motorized computer-controlled fiber-positioning system 25 and the fiber heating device 144 of the system 200.

Figure 11:
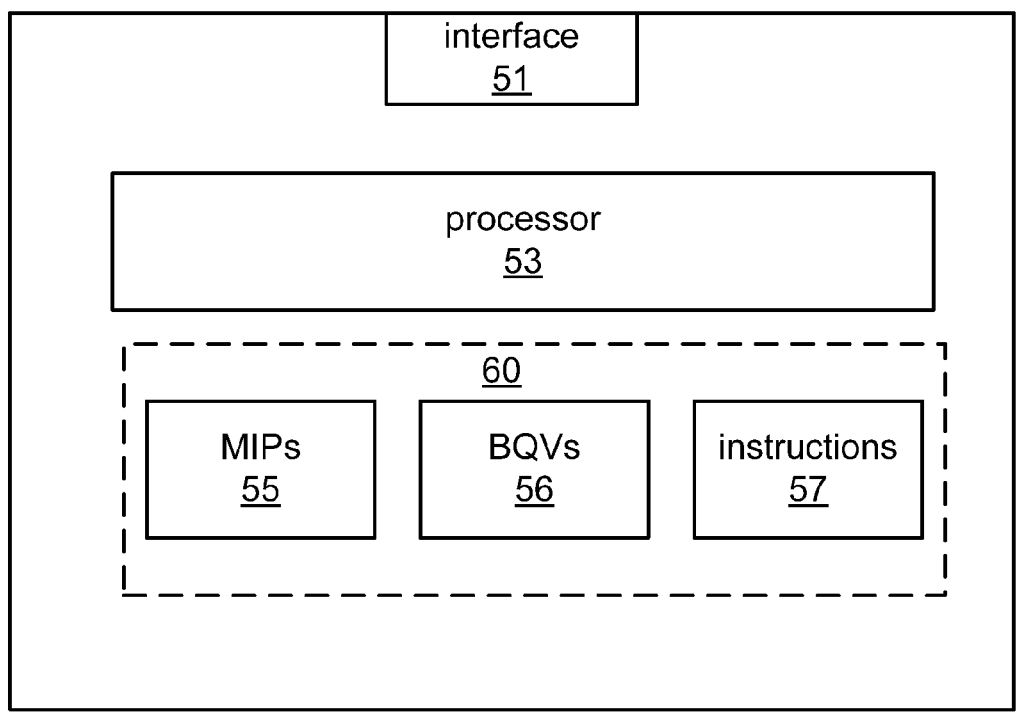
FIG. 11 is a schematic block diagram of a computer configured for use in the method of waveguide alignment of FIG. 10.

With reference to FIG. 11, the computer 50 of systems 100 and 200 may be embodied for example as a general-purpose computer device or a specialized computer device, and may generally include a processor 53, one or more non-transitory memory devices 60 that are readable by the processor 53, and an interface 51 for communicating with the PDA 30 and, in at least some embodiments, with the motorized computer-controlled fiber positioning system 25 or 125. In one embodiment, the one or more non-transitory memory devices 60 implement the MIP source 55 for storing or generating one or more MIPs 235, a second memory unit 56 for storing the BQVs 250 obtained for different fiber alignment positions, and a third memory unit 57 for storing a set of processor-executable instructions for implementing various operations and computer algorithms as described hereinabove, for example with reference to the block diagrams of FIGS. 4 and 9, and flowcharts of FIGS. 7, 8 and 10.

In one embodiment, memory unit 57 stores instructions for causing the processor 53 to execute a process that includes: (a) obtaining a multi-wavelength beam intensity profile from the beam image signals read from PDA 30, (b) estimating, based on the multi-wavelength beam profile and the plurality of mode intensity profiles stored in the memory, a relative contribution of a selected waveguide mode from the plurality of the waveguide modes into the optical power of the light beam, and (c) providing a beam quality value that is based at least in part on the relative contribution of the selected waveguide mode. In one embodiment, the set of instructions stored in the memory 57 further includes instructions for causing the processor 53 to: (d) generate control signals for the computer-controlled waveguide positioning system to sequentially position the output end of the second waveguide and the input end of the first waveguide in a plurality of different alignment positions; (e) repeat (a) to (c) recited hereinabove for each of the plurality of different alignment positions to obtain a plurality of the beam quality values; (f) selecting one of the plurality of different alignment positions that provides a highest beam quality value from the plurality of beam quality values as a preferred alignment; and, (g) generating a control signal for the computer-controlled motorized waveguide positioning system to position the output end of the second waveguide and the input end of the first waveguide in a position of the preferred alignment at the junction.

The above-described exemplary embodiments are intended to be illustrative in all respects, rather than restrictive, of the present invention. For example, although the exemplary embodiments have been described hereinabove with reference to optical fibers, they may also be equally applied to other types of optical waveguides. Furthermore, each of the exemplary embodiments described hereinabove may utilize features that were described herein with reference to other embodiments. Thus the present invention is capable of many variations in detailed implementation that can be derived from the description contained herein by a person skilled in the art. All such variations and modifications are considered to be within the scope and spirit of the present invention as defined by the following claims.

We claim:

1. A method comprising:
   a) launching a plurality of light wavelengths into an input end of a first waveguide using a multi-wavelength light source, wherein the first waveguide is capable of supporting a plurality of waveguide modes;
   b) receiving an output light beam from an output end of the first waveguide with a photodetector array (PDA) for generating electrical signals carrying beam image data;
   c) using a computer operationally coupled to the PDA to obtain a multi-wavelength beam intensity profile for the output light beam from the beam image data, wherein the multi-wavelength beam intensity profile comprises contributions from each of the plurality of light wavelengths; and,
   d) estimating, with the computer, a relative contribution of a selected waveguide mode from the plurality of waveguide modes into an optical power of the output light beam based on the multi-wavelength beam intensity profile and one or more mode intensity profiles corresponding to one or more waveguide modes of the first waveguide;
   wherein the plurality of light wavelengths launched into the first waveguide spans a wavelength range that is sufficiently broad so as to average out contributions from phase-dependent inter-modal interference at the plurality of light wavelengths into the multi-wavelength beam intensity profile.

2. The method of claim 1, further comprising:
   e) obtaining a beam quality value that is based at least in part on the relative contribution of the selected waveguide mode into the optical power of the output light beam.

3. The method of claim 1, wherein the one or more mode intensity profiles comprises a plurality of mode intensity profiles corresponding to the plurality of waveguide modes of the first waveguide, and wherein d) comprises determining a superposition of the mode intensity profiles that matches the multi-wavelength beam intensity profile.

4. The method of claim 3, wherein d) comprises using a fitting algorithm to determine weighting coefficients in a weighted sum of the plurality of mode intensity profiles that matches the multi-wavelength beam intensity profile.

5. The method of claim 1, wherein d) comprises computing an overlap of the mode intensity profile of the selected waveguide mode with the multi-wavelength beam intensity profile.

6. The method of claim 1, wherein the selected waveguide mode comprises a fundamental mode of the first waveguide.

7. The method of claim 1, wherein the plurality of light wavelengths spans the wavelength range having a width of 30 nanometers or greater.

8. The method of claim 1, wherein the multi-wavelength light source comprises a broad-band light source, wherein a) comprises simultaneously emitting the plurality of light wavelengths with the broad-band light source, and wherein b) comprises PDA capturing a multi-wavelength cross-sectional image of the output light beam comprising contributions from the plurality of light wavelengths.

9. The method of claim 1 wherein the multi-wavelength light source comprises a tunable light source, wherein a) comprises tuning a wavelength of light generated by the tunable light source across the wavelength range, and wherein c) comprises using the computer to compute a sum of a plurality of instantaneous beam intensity profiles captured with the PDA at different time instances during the tuning.

10. The method of claim 2, wherein a) comprises:
  a1) providing a second waveguide in front of the first waveguide in an alignment therewith so that an output end of the second waveguide is in a close proximity with the input end of the first waveguide to provide an optical coupling therebetween;
  a2) launching the plurality of light wavelengths into an input end of the second waveguide for coupling into the first waveguide.

11. The method of claim 10 further comprising:
  f) repeating steps a) to e) for a plurality of different alignments between the second and first waveguides to obtain a plurality of the beam quality values;
  g) selecting as a preferred alignment one of the plurality of different alignments that provides a highest beam quality value from the plurality of beam quality values; and,
  h) fixing the output end of the second waveguide and the input end of the first waveguide in a relative position of the preferred alignment between the second waveguide and the first waveguide.

12. The method of claim 11 wherein the first waveguide comprises a first optical fiber and the second waveguide comprises a second optical fiber.

13. The method of claim 12, further comprising fusing together the output end of the second optical fiber and the input end of the first optical fiber at a junction in response to receiving from the computer an indication that the first and second optical fibers are in a position of the preferred alignment.

14. The method of claim 11, wherein f) comprises using a computer-controlled waveguide positioning system configured to position the output end of the second waveguide and the input end of the first waveguide in an alignment with each other and to controllably vary said alignment in response to a control signal from the computer.

15. A system, comprising:
  a waveguide holder for holding a first optical waveguide comprising an input end and an output end;
  a multi-wavelength light source for launching a plurality of light wavelengths into the input end of the first optical waveguide;
  a photodetector array (PDA) for receiving an output optical beam from the output end of the first optical waveguide and for generating beam image signals comprising a cross-sectional image of the output optical beam; and,
  a computer operationally coupled to the PDA for receiving therefrom the beam image signals, the computer comprising a processor and a memory, the memory storing a set of instructions for causing the processor to execute a process comprising:
  a) obtaining a multi-wavelength beam intensity profile from the beam image signals, and
  b) estimating, based on the multi-wavelength beam intensity profile and one or more mode intensity profiles corresponding to one or more waveguide modes of the first waveguide, a relative contribution of a selected waveguide mode from the one or more waveguide modes into an optical power of the optical beam;
  wherein the plurality of light wavelengths launched into the first waveguide spans a wavelength range that is sufficiently broad so as to average out contributions from phase-dependent inter-modal interference into the multi-wavelength beam intensity profile.

16. The system of claim 15, wherein the set of instructions stored in the memory further comprises instructions for:
  c) obtaining a beam quality value that is based at least in part on the relative contribution of the selected waveguide mode.

17. The system of claim 16, wherein:
  the waveguide holder comprises a computer-controlled waveguide positioning system for holding a second waveguide in front of the first optical waveguide in an alignment therewith so that an output end of the second waveguide is in a close proximity with the input end of the first optical waveguide at a junction for providing an optical coupling therebetween;
  the computer-controlled waveguide positioning system is configured to, responsive to a control signal from the computer, move one of the output end of the second waveguide and the input end of the first optical waveguide relative to each other so as to controllably vary their relative alignment at the junction; and,
  the set of instructions stored in the memory further comprises instructions for causing the processor to:
  d) generate control signals for the computer-controlled waveguide positioning system to sequentially position the output end of the second waveguide and the input end of the first optical waveguide in a plurality of different alignment positions; and,
  e) repeat a) to c) for each of the plurality of different alignment positions to obtain a plurality of beam quality values.

18. The system of claim 17, wherein the set of instructions stored in the memory further comprises instructions for causing the processor to select one of the plurality of different alignment positions that provides a highest beam quality value from the plurality of beam quality values as a preferred alignment, and to generate a control signal for the computer-controlled waveguide positioning system to position the output end of the second waveguide and the input end of the first optical waveguide in a position of the preferred alignment at the junction.

19. The system of claim 18 further comprising a fusing device that is configured to fuse together the output end of the second waveguide and the input end of the first optical waveguide in response to receiving from the computer a control signal indicating that the first optical waveguide and the second waveguide are in the position of the preferred alignment at the junction.

20. The system of claim 15, wherein the memory stores a plurality of mode intensity profiles corresponding to a plurality of modes of the first optical waveguide, and the set of instructions stored in the memory further comprises instructions for executing a computer algorithm for determining a superposition of the mode intensity profiles from the plurality of mode intensity profiles that substantially matches the multi-wavelength beam intensity profile.

\* \* \* \* \*